(12) United States Patent
Roberts

(10) Patent No.: US 10,991,215 B2
(45) Date of Patent: Apr. 27, 2021

(54) INTELLIGENT SIGNAGE

(71) Applicant: IDEAL Industries Lighting LLC, Sycamore, IL (US)

(72) Inventor: John Roberts, Durham, NC (US)

(73) Assignee: IDEAL Industries Lighting LLC, Racine, WI (US)

( * ) Notice: Subject to any disclaimer, the term of this patent is extended or adjusted under 35 U.S.C. 154(b) by 0 days.

(21) Appl. No.: 15/926,546

(22) Filed: Mar. 20, 2018

(65) Prior Publication Data

US 2019/0295386 A1    Sep. 26, 2019

(51) Int. Cl.
*G08B 7/06* (2006.01)
*G09F 13/22* (2006.01)
(Continued)

(52) U.S. Cl.
CPC ......... *G08B 7/062* (2013.01); *G06K 9/00362* (2013.01); *G09F 13/22* (2013.01);
(Continued)

(58) Field of Classification Search
CPC .... G08B 7/062; G08B 7/066; G06K 9/00362; G06K 9/00369; G06K 9/00771;
(Continued)

(56) References Cited

U.S. PATENT DOCUMENTS 4,679,086 A    7/1987  May
8,035,320 B2   10/2011 Sibert
(Continued)

FOREIGN PATENT DOCUMENTS

JP    2010141663 A    6/2010
WO    2010004514 A1   1/2010
(Continued)

OTHER PUBLICATIONS

Abdi, Hervé, "Metric Multidimensional Scaling (MDS): Analyzing Distance Matrices," Encyclopedia of Measurement and Statistics, 2007, Thousand Oaks, California, SAGE Publications, Inc., 13 pages.
(Continued)

*Primary Examiner* — Brian Wilson
(74) *Attorney, Agent, or Firm* — Withrow & Terranova, P.L.L.C.

(57) ABSTRACT

An intelligent sign, such as an exit or other informational sign, is equipped with control circuitry, at least one sensor, and in certain embodiments, a communication interface. The control circuitry can monitor sensor data from the associated sensors. The sensor data bears on various conditions or events associated with the area that is associated with the exit sign. Based on the sensor data, the intelligent sign can provide one or more operations. A sign operation may include any operation provided by the intelligent sign. When equipped with the communication interface, the intelligent sign may control its own internal operation and/or control the operation of other entities based on the sensor data, the type of sensor data, the content of the sensor data, and the like. The intelligent sign may also share sensor data or other information derived from the sensor data with other entities.

38 Claims, 27 Drawing Sheets

(51) Int. Cl.
*H02J 9/06* (2006.01)
*G06K 9/00* (2006.01)
*G09F 13/04* (2006.01)
*G09F 7/00* (2006.01)
*G06Q 90/00* (2006.01)
*G09F 19/22* (2006.01)

(52) U.S. Cl.
CPC .......... H02J 9/065 (2013.01); *G06Q 90/205* (2013.01); *G09F 2007/005* (2013.01); *G09F 2013/045* (2013.01); *G09F 2013/0459* (2013.01); *G09F 2013/222* (2013.01); *G09F 2019/225* (2013.01)

(58) Field of Classification Search
CPC ......... H02J 9/065; H02J 7/0048; G09F 13/22; G09F 2013/222; G09F 2013/045; G09F 2013/0459; G09F 2007/005; G09F 2019/225; G09F 27/005; G09F 27/004; E06B 65/10; E05B 2047/0086; E05B 65/108; G06Q 90/205
See application file for complete search history.

(56) References Cited

U.S. PATENT DOCUMENTS

| | | | |
|---|---|---|---|
| 8,829,821 B2 | 9/2014 | Chobot et al. |
| 8,912,735 B2 | 12/2014 | Chobot et al. |
| 8,975,827 B2 | 3/2015 | Chobot et al. |
| 9,155,165 B2 | 10/2015 | Chobot |
| 9,155,166 B2 | 10/2015 | Chobot |
| 9,433,061 B2 | 8/2016 | Chobot |
| 9,456,482 B1 | 9/2016 | Pope et al. |
| 9,572,226 B2 | 2/2017 | Motley et al. |
| 9,686,477 B2 | 6/2017 | Walters et al. |
| 9,706,617 B2 | 7/2017 | Carrigan et al. |
| 9,717,125 B2 | 7/2017 | Carrigan et al. |
| 9,723,673 B2 | 8/2017 | Carrigan et al. |
| 9,723,696 B2 | 8/2017 | Carrigan et al. |
| 9,730,289 B1 | 8/2017 | Hu et al. |
| 9,769,900 B2 | 9/2017 | Underwood et al. |
| 9,795,016 B2 | 10/2017 | Motley et al. |
| 9,826,598 B2 | 11/2017 | Roberts et al. |
| 9,872,367 B2 | 1/2018 | Carrigan et al. |
| 9,888,546 B2 | 2/2018 | Deese et al. |
| 9,894,740 B1 | 2/2018 | Liszt et al. |
| 9,991,399 B2 | 6/2018 | Mieczkowski et al. |
| 2006/0071780 A1 | 4/2006 | McFarland |
| 2007/0061050 A1 | 3/2007 | Hoffknecht |
| 2008/0125161 A1 | 5/2008 | Ergen et al. |
| 2008/0197790 A1* | 8/2008 | Mangiaracina ......... F21V 23/04 315/312 |
| 2008/0273754 A1 | 11/2008 | Hick et al. |
| 2009/0045971 A1 | 2/2009 | Simons et al. |
| 2009/0241390 A1 | 10/2009 | Roberts |
| 2009/0262189 A1 | 10/2009 | Marman |
| 2010/0182294 A1 | 7/2010 | Roshan et al. |
| 2010/0262296 A1 | 10/2010 | Davis et al. |
| 2010/0271802 A1* | 10/2010 | Recker ............... H05B 33/0803 362/20 |
| 2010/0295946 A1 | 11/2010 | Reed et al. |
| 2011/0007168 A1 | 1/2011 | Nagara et al. |
| 2011/0031897 A1 | 2/2011 | Henig et al. |
| 2011/0050461 A1* | 3/2011 | Pixley ................ G08G 1/0104 340/933 |
| 2011/0199004 A1 | 8/2011 | Henig et al. |
| 2011/0241877 A1* | 10/2011 | Wedig ................ G08B 25/016 340/540 |
| 2012/0038281 A1 | 2/2012 | Verfuerth |
| 2012/0126700 A1* | 5/2012 | Mayfield ................ H05B 47/19 315/86 |
| 2012/0143357 A1 | 6/2012 | Chemel et al. |
| 2012/0146518 A1 | 6/2012 | Keating et al. |
| 2012/0235579 A1 | 9/2012 | Chemel et al. |
| 2013/0182906 A1 | 7/2013 | Kojo et al. |
| 2013/0221203 A1 | 8/2013 | Barrilleaux |
| 2013/0257292 A1 | 10/2013 | Verfuerth et al. |
| 2013/0293877 A1 | 11/2013 | Ramer et al. |
| 2013/0307419 A1 | 11/2013 | Simonian et al. |
| 2014/0001963 A1 | 1/2014 | Chobot et al. |
| 2014/0028200 A1 | 1/2014 | Van Wagoner et al. |
| 2014/0062312 A1 | 3/2014 | Reed |
| 2014/0072211 A1 | 3/2014 | Kovesi et al. |
| 2014/0159577 A1 | 6/2014 | Manoukis et al. |
| 2014/0167653 A1 | 6/2014 | Chobot |
| 2014/0211985 A1 | 7/2014 | Polese et al. |
| 2014/0217261 A1 | 8/2014 | De Groot et al. |
| 2014/0240966 A1* | 8/2014 | Garcia .................. H02J 7/0086 362/183 |
| 2014/0266916 A1 | 9/2014 | Pakzad et al. |
| 2014/0266946 A1 | 9/2014 | Bily et al. |
| 2015/0008831 A1 | 1/2015 | Carrigan et al. |
| 2015/0097975 A1 | 4/2015 | Nash et al. |
| 2015/0208490 A1 | 7/2015 | Bishop et al. |
| 2015/0245451 A1 | 8/2015 | Sung et al. |
| 2015/0264784 A1 | 9/2015 | Romano |
| 2015/0287295 A1* | 10/2015 | Trivelpiece ............. H04L 45/74 340/6.1 |
| 2015/0305119 A1 | 10/2015 | Hidaka et al. |
| 2015/0309174 A1 | 10/2015 | Giger |
| 2015/0351169 A1 | 12/2015 | Pope et al. |
| 2015/0370848 A1 | 12/2015 | Yach et al. |
| 2015/0373808 A1 | 12/2015 | Kuo et al. |
| 2016/0095189 A1 | 3/2016 | Vangeel et al. |
| 2016/0100086 A1 | 4/2016 | Chien |
| 2016/0112870 A1 | 4/2016 | Pathuri |
| 2016/0124081 A1 | 5/2016 | Charlot et al. |
| 2016/0192458 A1 | 6/2016 | Keith |
| 2016/0270179 A1 | 9/2016 | Ryhorchuk et al. |
| 2016/0282126 A1 | 9/2016 | Watts et al. |
| 2016/0286619 A1 | 9/2016 | Roberts et al. |
| 2017/0185057 A1 | 6/2017 | Ashdown et al. |
| 2017/0228874 A1 | 8/2017 | Roberts |
| 2017/0230364 A1 | 8/2017 | Barile et al. |
| 2017/0231045 A1 | 8/2017 | Hu et al. |
| 2017/0231060 A1 | 8/2017 | Roberts et al. |
| 2017/0231061 A1 | 8/2017 | Deese et al. |
| 2017/0231066 A1 | 8/2017 | Roberts et al. |
| 2017/0366970 A1 | 12/2017 | Yu |
| 2018/0014394 A1 | 1/2018 | Motley et al. |
| 2018/0103529 A1 | 4/2018 | Carrigan et al. |
| 2018/0123821 A1* | 5/2018 | Alberth, Jr. ......... H04L 12/2827 |
| 2018/0375444 A1* | 12/2018 | Gamroth ................. H04Q 9/00 |
| 2019/0007548 A1* | 1/2019 | Sit ...................... H04M 1/72572 |

FOREIGN PATENT DOCUMENTS

| | | |
|---|---|---|
| WO | 2012143814 A1 | 10/2012 |
| WO | 2013121342 A2 | 8/2013 |
| WO | 2013158955 A1 | 10/2013 |
| WO | 2014147524 A1 | 9/2014 |
| WO | 2015103482 A1 | 7/2015 |

OTHER PUBLICATIONS

Author Unknown, "Procrustes analysis," https://en.wikipedia.org/wiki/Procrustes_analysis, Jul. 16, 2016, Wikipedia, 5 pages.

Author Unknown, "Thread Commissioning," Revision 2.0, Jul. 13, 2015, Thread Group, Inc., www.threadgroup.org, 26 pages.

Author Unknown, "Thread Stack Fundamentals," Revision 2.0, Jul. 13, 2015, Thread Group, Inc., www.threadgroup.org, 21 pages.

Berclaz, Jérôme, et al., "Robust People Tracking with Global Trajectory Optimization," IEEE Computer Society Conference on Computer Vision and Pattern Recognition, Jun. 17-22, 2006, New York, New York, USA, 7 pages.

Boots, Byron, et al., "A Spectral Learning Approach to Range-Only SLAM," Proceedings of the 30th International Conference on Machine Learning, vol. 28, 2013, Atlanta, Georgia, JMLR Workshop and Conference Proceedings, 8 pages.

(56) References Cited

OTHER PUBLICATIONS

Dalal, Navneet, et al., "Histograms of Oriented Gradients for Human Detection," IEEE Computer Society Conference on Computer Vision and Pattern Recognition, Jun. 20-25, 2005, San Diego, California, USA, 8 pages.
Kalman, R. E., "A New Approach to Linear Filtering and Prediction Problems," Transactions of the ASME—Journal of Basic Engineering, vol. 82, Series D, Jan. 1960, 12 pages.
Kobourov, Stephen, G., "Force-Directed Drawing Algorithms," Handbook of Graph Drawing and Visualization, Chapter 12, 2013, CRC Press, pp. 383-408.
Mathew, Manu, et al., "Sparse, Quantized, Full Frame CNN for Low Power Embedded Devices," 2017 IEEE Conference on Computer Vision and Pattern Recognition Workshops (CVPRW), Jul. 21-26, 2017, Honolulu, Hawaii, USA, 9 pages.
Satpathy, Amit, et al., "Human Detection by Quadratic Classification on Subspace of Extended Histogram of Gradients," IEEE Transactions on Image Processing, vol. 23, No. 1, Jan. 2014, 11 pages.
Zeng, Chengbin, et al., "Robust Head-shoulder Detection by PCA-Based Multilevel HOG-LBP Detector for People Counting," 2010 International Conference on Pattern Recognition, Aug. 23-26, 2010, Istanbul, Turkey, 4 pages.
Zhu, Qiang, et al., "Fast Human Detection Using a Cascade of Histograms of Oriented Gradients," IEEE Computer Society Conference on Computer Vision and Pattern Recognition, Jun. 17-22, 2005, New York, New York, USA, 8 pages.
Non-Final Office Action for U.S. Appl. No. 15/192,308, dated Jul. 3, 2017, 11 pages.
Final Office Action for U.S. Appl. No. 15/192,308, dated Oct. 20, 2017, 12 pages.
Advisory Action and Interview Summary for U.S. Appl. No. 15/192,308, dated Jan. 25, 2018, 5 pages.
Non-Final Office Action for U.S. Appl. No. 15/192,308, dated Mar. 15, 2018, 10 pages.
Non-Final Office Action for U.S. Appl. No. 15/192,479, dated Jan. 6, 2017, 17 pages.
Non-Final Office Action for U.S. Appl. No. 15/192,479, dated Dec. 15, 2017, 11 pages.
Notice of Allowance for U.S. Appl. No. 15/192,479, dated May 9, 2018, 7 pages.
Non-Final Office Action for U.S. Appl. No. 15/192,035, dated May 31, 2017, 19 pages.
Final Office Action for U.S. Appl. No. 15/192,035, dated Sep. 14, 2017, 15 pages.
Advisory Action for U.S. Appl. No. 15/192,035, dated Dec. 1, 2017, 3 pages.
Non-Final Office Action for U.S. Appl. No. 15/192,035, dated Mar. 9, 2018, 16 pages.
Non-Final Office Action for U.S. Appl. No. 15/191,846, dated Mar. 22, 2017, 12 pages.
Notice of Allowance for U.S. Appl. No. 15/191,846, dated Jul. 13, 2017, 8 pages.
Notice of Allowance for U.S. Appl. No. 15/621,695, dated Sep. 21, 2017, 8 pages.
International Search Report and Written Opinion for International Patent Application No. PCT/US2017/016448, dated Apr. 6, 2017, 16 pages.
International Search Report and Written Opinion for International Patent Application No. PCT/US2017/016454, dated Apr. 6, 2017, 16 pages.
International Search Report and Written Opinion for International Patent Application No. PCT/US2017/016469, dated Apr. 6, 2017, 16 pages.
Non-Final Office Action for U.S. Appl. No. 15/849,986, dated Apr. 19, 2018, 9 pages.
Non-Final Office Action for U.S. Appl. No. 14/623,314, dated Oct. 6, 2016, 13 pages.
Notice of Allowance for U.S. Appl. No. 15/681,941, dated Apr. 13, 2018, 8 pages.

\* cited by examiner

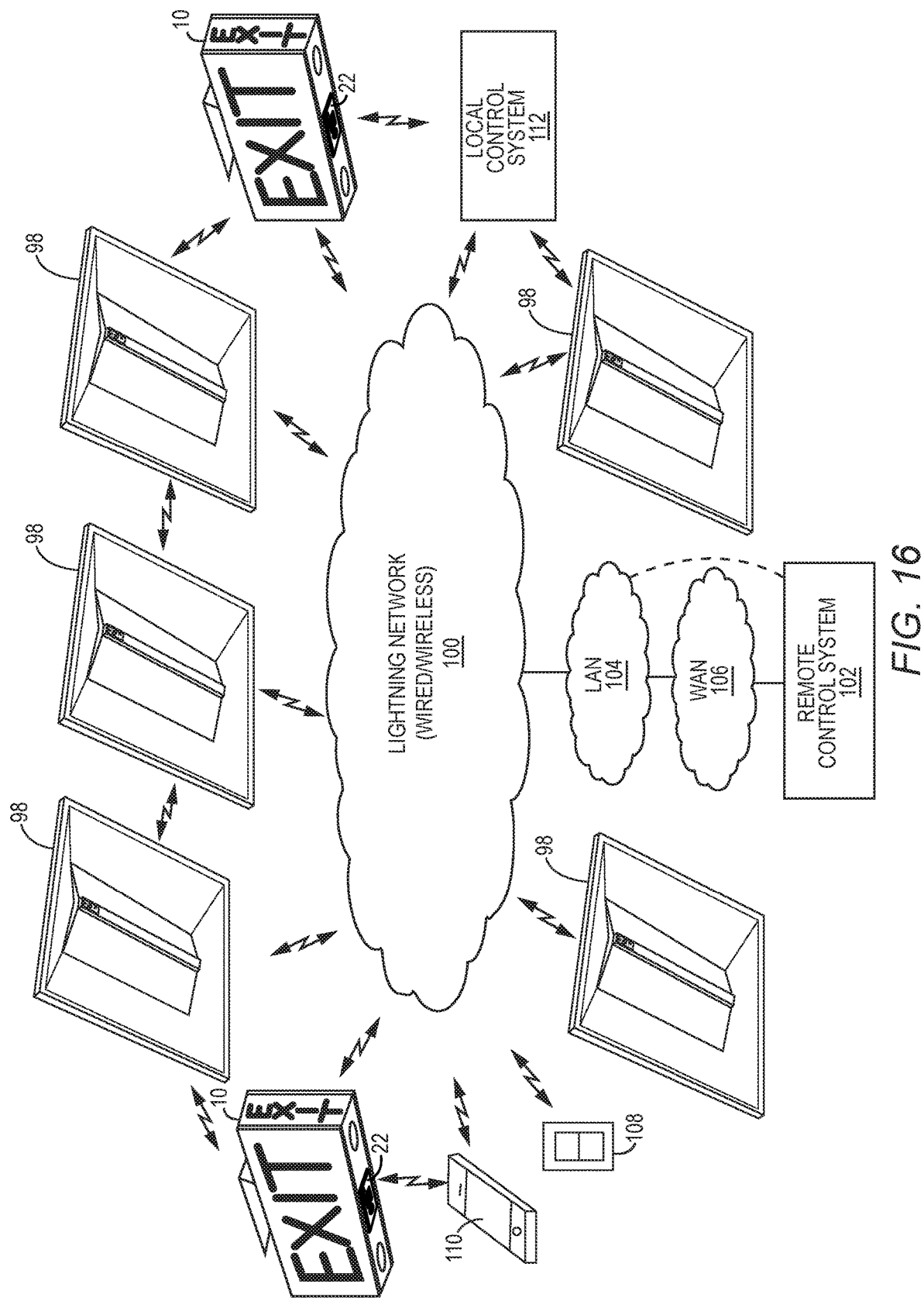

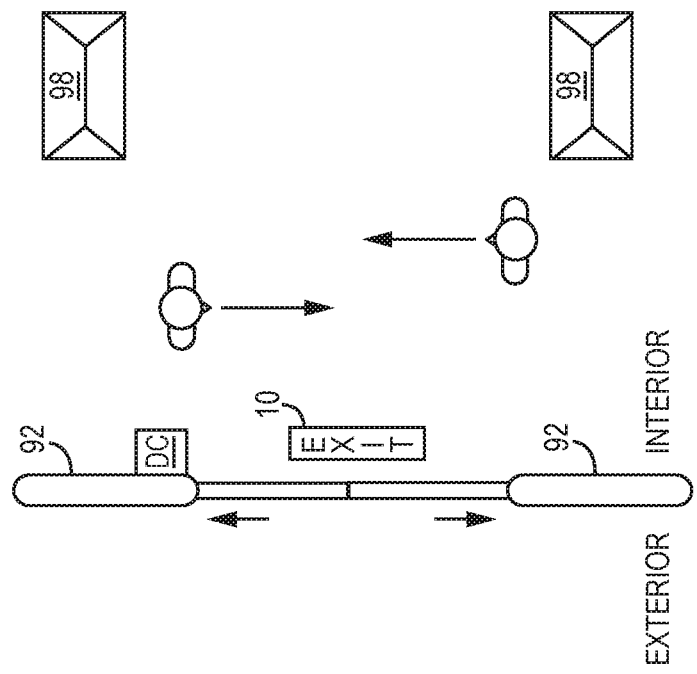
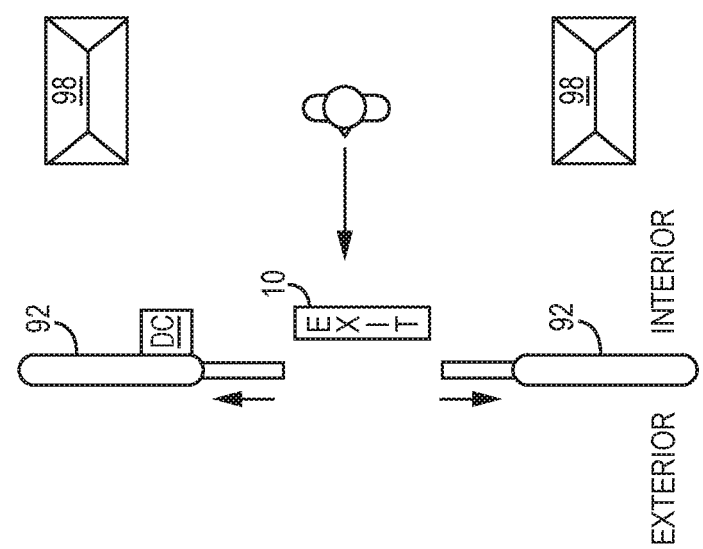
FIG. 17D
FIG. 17C

INTELLIGENT SIGNAGE

FIELD OF THE DISCLOSURE

The present disclosure relates to intelligent signs, such as intelligent exit signs, which incorporate sensors and/or are capable of communicating with other entities such as lighting fixtures, control entities, and the like.

BACKGROUND

Exit signs are employed at the exits and throughout commercial and industrial buildings to identify exits and lead occupants to those exits during both normal operation and in cases of emergency. Traditionally, exits signs are standalone devices that receive AC power and are coupled to a battery backup when the AC power is lost. These exit signs generally have little or no processing capability, and are isolated from other building systems, such as lighting networks and building management systems. Accordingly, the exit signs serve a single purpose and afford little or no value to other systems associated with the building in which the exit signs reside.

SUMMARY

An intelligent sign, such as an exit sign, is equipped with control circuitry, at least one sensor, and in certain embodiments, a communication interface. The control circuitry can monitor sensor data from the associated sensors. The sensor data bears on various conditions or events associated with the area that is associated with the exit sign. Based on the sensor data, the intelligent sign can provide one or more operations, which are referred to herein as a "sign operation," or "exit sign operation" in the case of an exit sign. A sign operation may include any operation provide by the intelligent sign. When equipped with the communication interface, the intelligent sign may control its own internal operation and/or control the operation of other entities based on the sensor data, the type of sensor data, the content of the sensor data, and the like. The intelligent sign may also share sensor data or other information derived from the sensor data with other entities.

The intelligent sign may also receive sensor data, information, and/or instructions from other entities and respond or react accordingly. For example, the intelligent sign may make decisions based on sensor data received from one or more of the sensors as well as sensor data, information, and/or instructions from the other entities. The intelligent sign may be used to control other entities, may be controlled by other entities, and the like in systems that employ centralized and distributed processing.

These entities with which the intelligent sign communicates may take virtually any form. Some non-limiting examples include building management systems, door control systems, lighting fixtures, other signs, including exit signs, remote control systems and the like that are standalone devices or part of a network such as a lighting network, exit sign network, local area network (LAN), and the like.

In one embodiment, an exit sign includes a body having a panel displaying information related to a building exit; a first light source configured to illuminate the information; a first sensor; a communication interface; and control circuitry associated with the first light source and the first sensor. The control circuitry is configured to receive first sensor data from the first sensor; provide an exit sign operation based on the first sensor data; and communicate with at least one remote entity via the communication interface.

To provide an exit sign operation, the control circuitry may be configured to determine whether an area associated with the exit sign is occupied based at least in part on the first sensor data. The control circuitry may be further configured to send information indicative of whether the area associated with the exit sign is occupied to the at least one remote entity via the communication interface.

To provide an exit sign operation, the control circuitry may be configured to determine when an individual enters an area associated with the exit sign based on the sensor data and increment an occupancy count based on the individual entering the area associated with the exit sign; and determine when an individual exits an area associated with the exit sign based on the sensor data and decrement the occupancy count based on the individual exiting the area associated with the exit sign. The control circuitry may be further configured to receive information indicative of an individual entering or exiting the area associated with the exit sign from the at least one remote entity and respectively incrementing or decrementing the occupancy count based on the information indicative of the individual entering or exiting the area associate with the exit sign.

To provide an exit sign operation, the control circuitry may be configured to determine when an individual enters or exits an area associated with the exit sign based on the sensor data; and send information indicative of the individual entering or exiting the area associated with the exit sign to the at least one remote entity via the communication interface.

To provide an exit sign operation, the control circuitry may be configured to determine a direction of travel of an individual within an area associated with the exit sign based on the first sensor data; and send information indicative of an individual moving in the direction of travel to the at least one remote entity. The control circuitry may be further configured to determine that the at least one remote entity is in the direction of travel. The control circuitry may be configured to determine a velocity of travel of the individual based on the first sensor data and send information indicative of the velocity of travel of the individual to the at least one remote entity.

To provide an exit sign operation, the control circuitry may be configured to determine a direction of travel of an individual within an area associated with the exit sign based on the first sensor data; determine an instruction upon determining the direction of travel of the individual; and send an instruction to the at least one remote entity in response to determining the direction of travel of the individual, wherein direction of travel is toward the at least one remote entity.

The exit sign may further include an electronic display, such as an LED, OLED, alphanumeric, or like display associated with the control circuitry. To provide an exit sign operation, the control circuitry may be further configured to determine a number of people in an area associated with the exit sign based on the first sensor data. To provide the exit sign operation, the control circuitry may be configured to control the first light source based on the first sensor data.

To provide an exit sign operation, the control circuitry may be configured to generate an instruction for the at least one remote entity based on the first sensor data and send the instruction to the at least one remote entity via the communication interface.

To provide an exit sign operation, the control circuitry may be configured to send the first sensor data to the at least one remote entity via the communication interface.

The control circuitry may be configured to receive an instruction from the at least one remote entity via the communication interface, and provide an exit sign operation in response to receiving the information from the at least one remote entity.

To provide an exit sign operation, the control circuitry may be configured to join a lighting network via the communication interface. The at least one remote entity may be a lighting fixture that is a member of the lighting network.

To provide an exit sign operation, the control circuitry may be configured to join a communication network via the communication interface. The at least one remote entity comprises a lighting fixture and another exit sign that are members of the communication network.

To provide an exit sign operation, the control circuitry may be configured to join a communication network via the communication interface. The at least one remote entity may be another exit sign that is a member of the lighting network.

To provide an exit sign operation, the control circuitry may be configured to: determine whether an individual is about to pass through a door associated with the exit sign; and send an instruction to open the door to a door controller associated with the door upon determining that the individual is about to pass through the door.

To provide an exit sign operation, the control circuitry may be further configured to determine whether an individual is about to pass through a door associated with the exit sign or pass by the door without passing through the door based on the sensor data; and send an instruction to open the door to a door controller upon determining that the individual is about to pass through the door, wherein no instruction to open the door is provided upon determining that the individual will pass by the door without passing through the door.

In another embodiment, the exit sign comprising a body having a panel displaying information related to a building exit; a first light source configured to illuminate the information; and control circuitry associated with the first light source. The control circuitry is configured to:
receive power from a main power source when power is provided by the main power source and receive power from a battery backup when power is not provided by the main power source;
when power is provided by the main power source, control the first light source to output light at a first output level;
determine when the power is not provided by the main power source;
when the power is not provided by the main power source, control the first light source to output light at a second output level, which is different from the first output level.

The control circuitry may be configured to control the first light source to transition from the first output level to the second output level immediately upon determining that the power is not provided by the main power source.

The control circuitry may be configured to control the first light source to transition from the first output level to the second output level immediately after a defined period of time, which starts upon determining that the power is not provided by the main power source.

When the power is not provided by the main power source, the control circuitry may be configured to: monitor a charge level of the battery backup; and control the first light source to transition from the first output level to the second output level when the charge level of the battery backup falls below a defined threshold when the power is not provided by the main power source.

The second output level may vary based on the charge level of the battery backup when the power is not provided by the main power source.

The exit sign may further include a sensor associated with the control circuitry, wherein when the power is not provided by the main power source, the control circuitry is configured to:
receive sensor data from the sensor;
determine whether an area associated with the exit sign is occupied based on the sensor data; and
control the first light source to output light at the first output level when the area associated with the exit sign is occupied and to output light at the second output level when the area associated with the exit sign is not occupied.

The first output level may be greater than or less than the second output level. Any of the above embodiments may be provided in an intelligent sign that is not an exit sign. An exit sign is merely used as an example.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 16 illustrates a lighting network and associated components according to one embodiment of the disclosure.

FIG. 17C illustrates an occupant exiting a building that is equipped with automatic doors, according to one embodiment of the disclosure.

FIG. 17D illustrates an occupant walking in parallel to the doors in a building that is equipped with automatic doors, according to one embodiment of the disclosure.

DETAILED DESCRIPTION

Figure 1:
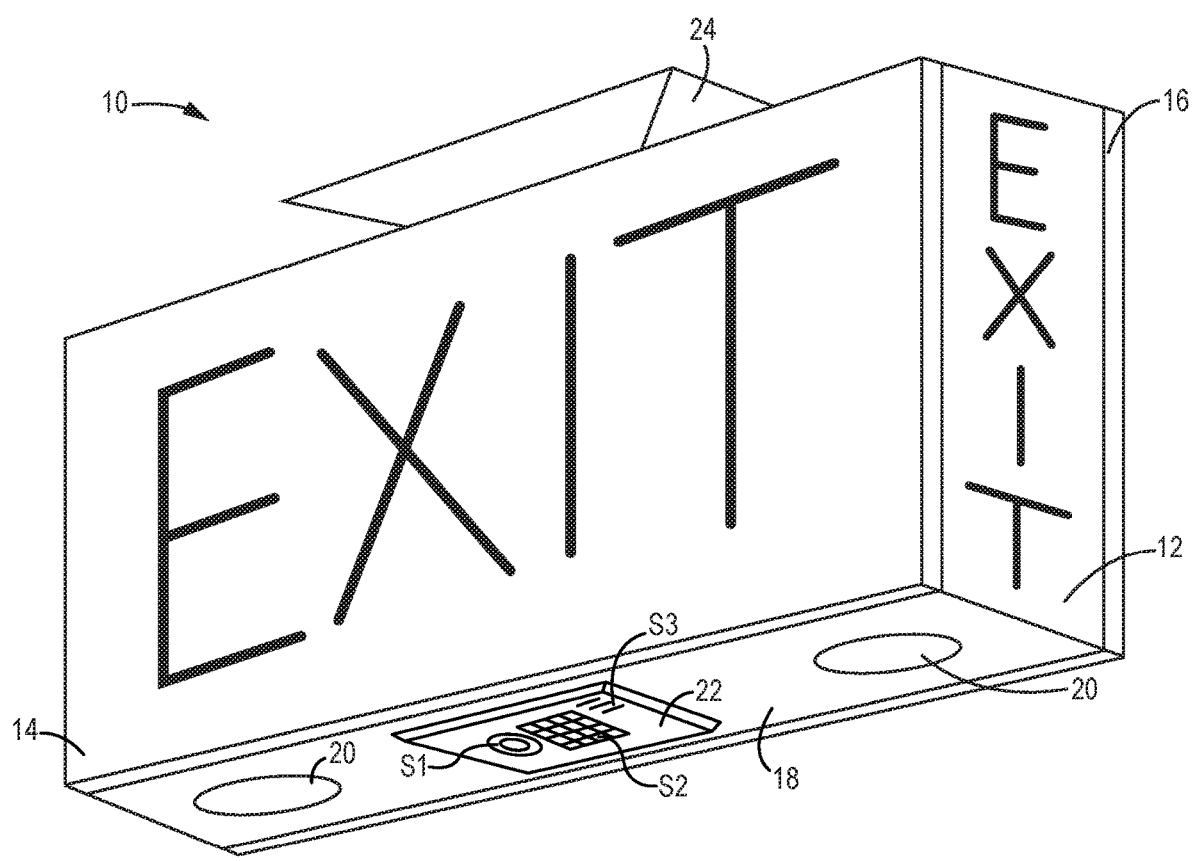
FIGS. 1 and 2 are different isometric views of an exit sign according to a first embodiment of the disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present disclosure relates to intelligent signs, such as intelligent exit, direction, and informational signs, which incorporate sensors and/or are capable of communicating with other entities such as lighting fixtures, control entities, and the like. The following description uses exit signs as the primary embodiment in which the concepts described below are implemented, but these concepts are applicable to virtually any type of sign, as those skilled in the art will appreciate.

Turning now to FIG. 1, a first embodiment of an exit sign 10 is illustrated. The exit sign 10 includes a central body 12 sandwiched between a front panel 14 and a rear panel 16. A bottom face 18 of the central body 12 includes one or more auxiliary light sources 20 and multiple sensors S1, S2, and S3, which in this embodiment are integrated into an intelligent sensor module (ISM), which will be described in further detail below. A mounting bracket 24 is attached to a top face of the central body 12, and in this embodiment, is used to mount the exit sign 10 to a ceiling.

In this embodiment, the front panel 14 includes the word "EXIT" and/or other relevant information. As illustrated, the word "EXIT" is also provided on a side face of the central body 12. Again, virtually any information may be provided on any portion of the exit sign 10, as the designer desires. Further, the shape and composition of the exit sign 10 as illustrated may vary from one embodiment to another. Again, the illustrated embodiments are directed to exit signs, but virtually any type of sign will benefit from the concepts disclosed herein, and the information provided on or by the sign will vary based on the type of sign.

Continuing with FIG. 1, the auxiliary light sources 20 may be used in normal operation to assist with general illumination lighting for an area beneath, near, or otherwise associated with the exit sign 10. In addition to or in lieu of general illumination, the auxiliary light sources 20 may be used in a different manner during certain conditions, such as in response to a power outage, detection of a fire, or the like. The auxiliary light sources 20, which may be LED-based light sources, and the drivers associated therewith may be configured to allow the auxiliary light sources 20 to output light of different colors, including white light at different color temperatures. Emitting light at different colors could convey different information. For example, emitting red light could indicate an emergency, emitting blue light could indicate a security issue, emitting a yellowish light could indicate the need to use caution, emitting white light could indicate a normal state, and the like. The backlighting or panel lighting for the exit sign 10 could be controlled in the same or similar fashion.

The sensors S1, S2, and S3 of the ISM 22 may take a variety of forms and may vary from one embodiment to another. A non-limiting list of potential sensors includes ambient light, occupancy (motion), sound (microphone), temperature, humidity, pressure, vibration, carbon monoxide, carbon dioxide, air quality, smoke, power, image, infrared (IR), ultrasonic, or like sensors. Notably, the image sensors may be monochrome or color CCD (charge coupled device) or CMOS (complementary metal oxide semiconductor) type image sensors. Color image sensors may be RGB (red, green, blue), RGGB (Bayer pattern RGB color filter array), RGB-IR (RGB plus IR), and the like. The IR sensors may operate on short, medium, or long infrared wavelength bands. Multiple ones of the same or combinations of any of these image sensors may be employed in an array for a more expansive field of view (FOV), to provide multiple FOVs, to enable stereoscopic depth sensing for one or more FOVs, and the like. Light detection and ranging (LIDAR), radio detection and ranging (RADAR), photomultiplier tube (PMT), optical time of flight, and like sensors are also envisioned.

The sensors S1, S2, S3 may also include proximity detectors, such as optical proximity detectors. For example, an optical proximity detector may include an optical emitter-detector pair that is configured to determine when something is within an associated field of view, within a certain range, or a combination thereof. The exit sign 10 may control its own operation or the operation of another device based on determining that a person or object has entered a field of view, is within a certain range, or both.

Further, speakers and the appropriate amplification and drivers may be employed to provide audible alerts, sirens, messages, background music, or like communications. Speakers and microphones on one or more exit signs 10, lighting fixtures, wall switches, plug load modules, or other devices capable of communicating by network may also be employed to use acoustic time of flight, phase, amplitude (volume), and the like to determine absolute or relative position and/or proximity for automatic grouping, alone or in association with other grouping techniques. Such microphones, alone or in multiples or in combination with speakers, may also be used for motion detection by monitoring an acoustic signature received via the microphone continuously and determining when there is a major change in signature. Such change detection may be as simple as monitoring the sound pressure (volume) in one or more predetermined bands and comparing the latest value to the running average of that parameter and applying a raw or normalized threshold to determine if someone has opened an associated door and/or passed under or nearby the exit sign). Alternatively or in combination with audible sound emitters and detectors, ultrasonic transducers may be incorporated and used for automatic grouping and for motion detection. Such audible or ultrasonic signals can also be used to actuate internal lights or associated lighting fixtures on the network, to cue an external monitoring system on the network, to lock or unlock an electronically controllable door lock, to open a hinged door, to rotate a revolving door, and the like).

Figure 2:
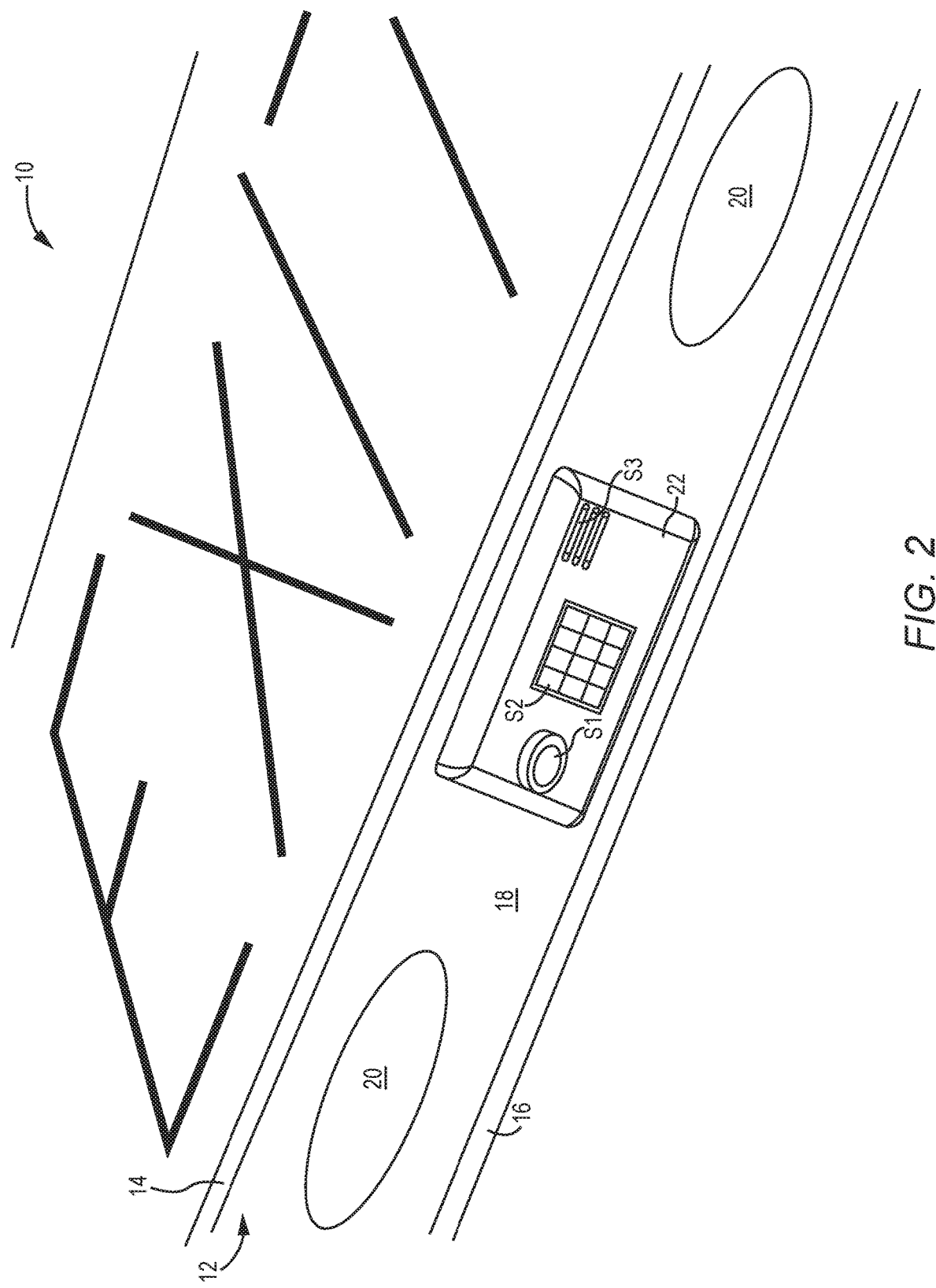

FIG. 2 provides an additional view of the bottom face of the central body 12 of the exit sign 10. The ISM 22 is more clearly illustrated, and in this embodiment, includes a vibration sensor S1, an image sensor S2, and a microphone S3. As described further below, the ISM 22 and/or the exit sign 10 will provide sufficient electronics to facilitate control of the exit sign 10, as well as communications with other entities, such as lighting fixtures and/or lighting networks, as will be described further below.

Equipped as described above, the exit sign 10, or like intelligent sign, can monitor sensor data from one or more associated sensors SX. The sensor data bears on various conditions or events associated with the area that is associated with the exit sign 10. Based on the sensor data, the exit sign 10 can provide one or more operations, which are referred to herein as a "sign operation," or "exit sign operation" in the case of an exit sign 10. An exit sign operation may include any operation provide by the exit sign 10. When equipped with communication capabilities, the exit sign 10 may control its own internal operation and/or control the operation of other entities based on the sensor data, the type of sensor data, the content of the sensor data, and the like. The exit sign may also share sensor data or other information derived from the sensor data with other entities.

The exit sign 10 may also receive sensor data, information, and/or instructions from other entities and respond or react accordingly. For example, the exit sign 10 may make decisions based on sensor data received from one or more of the sensors SX as well as sensor data, information, and/or instructions from the other entities. As described further below, the exit sign 10 may be used to control other entities, be controlled by other entities, and the like in systems that employ centralized and distributed processing.

These entities with which the exit sign 10 communicates may take virtually any form. Some non-limiting examples include building management systems, door control systems, lighting fixtures, wall switches, plug load modules, sensor modules, signs, including exit signs 10 and other signs, remote control systems, and the like that are stand-alone devices or part of network, such as a lighting network, exit sign network, local area network (LAN), and the like or combinations thereof. Numerous examples are provided further below.

An area associated with an exit sign 10 may vary based on the functionally desired. For example, the area associated with the sign may range from an area that is covered by one or more of the sensors SX, an area that is associated with a group of entities in an overall network, an area that is associated with an entire network of entities, a portion of a room in a building, a room in building, a floor of a building, a building, or the like. The area may be virtual or actual, depending on the desired functionality.

Figure 3:
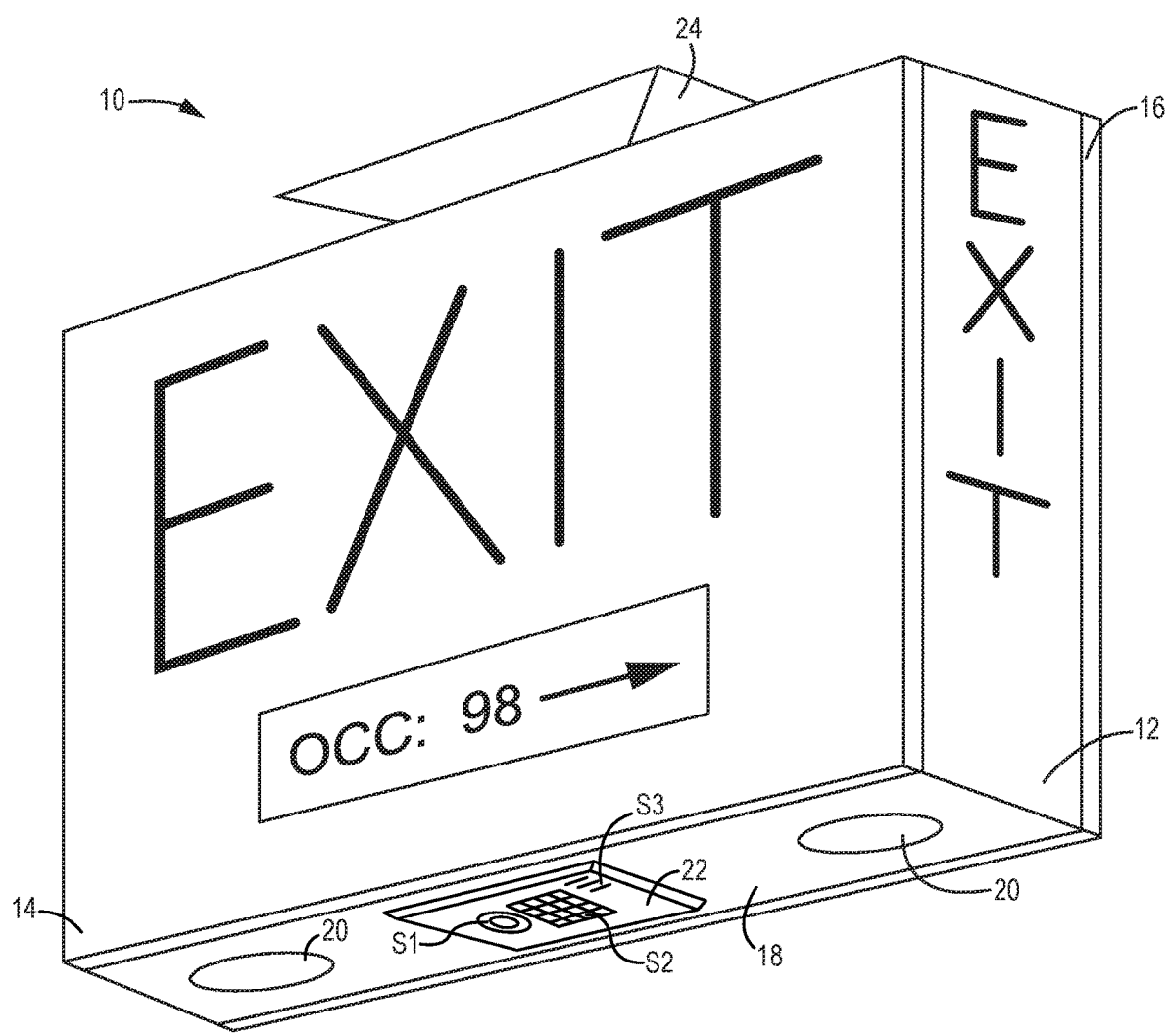
FIG. 3 is an isometric view of an exit sign according to a second embodiment of the disclosure.

The exit sign 10 may take various forms. For example, the exit sign 10 of FIG. 3 includes at least one display 26, which is integrated into the front panel 14. The display 26 may range from a basic alphanumeric display to a high-resolution graphical display on which static or dynamic text or graphics may be displayed. In this embodiment, text or graphics, such as the word "EXIT," may be permanently provided on a first portion of the front panel 14, and the display 26 may be integrated into the front panel 14 in another location. As will be described further below, the exit sign 10 may be configured to determine and track a number of occupants in a facility and display that information on the display 26, as provided in FIG. 3. Virtually any type of information derived from the sensors S1, S2, S3 of the exit sign 10 or associated devices may be presented on the display 26 along with any other type of information that is generated locally or received remotely from another device. In this example, a direction arrow (pointing right) is displayed on the display 26 along with the current occupancy count, which in this embodiment is 98. In alternative embodiments, the display 26 could show the current temperature, day, date, welcome messages, operational state, security conditions, and the like. The information may be cycled, flashed, or otherwise displayed in virtually any manner.

Figure 4:
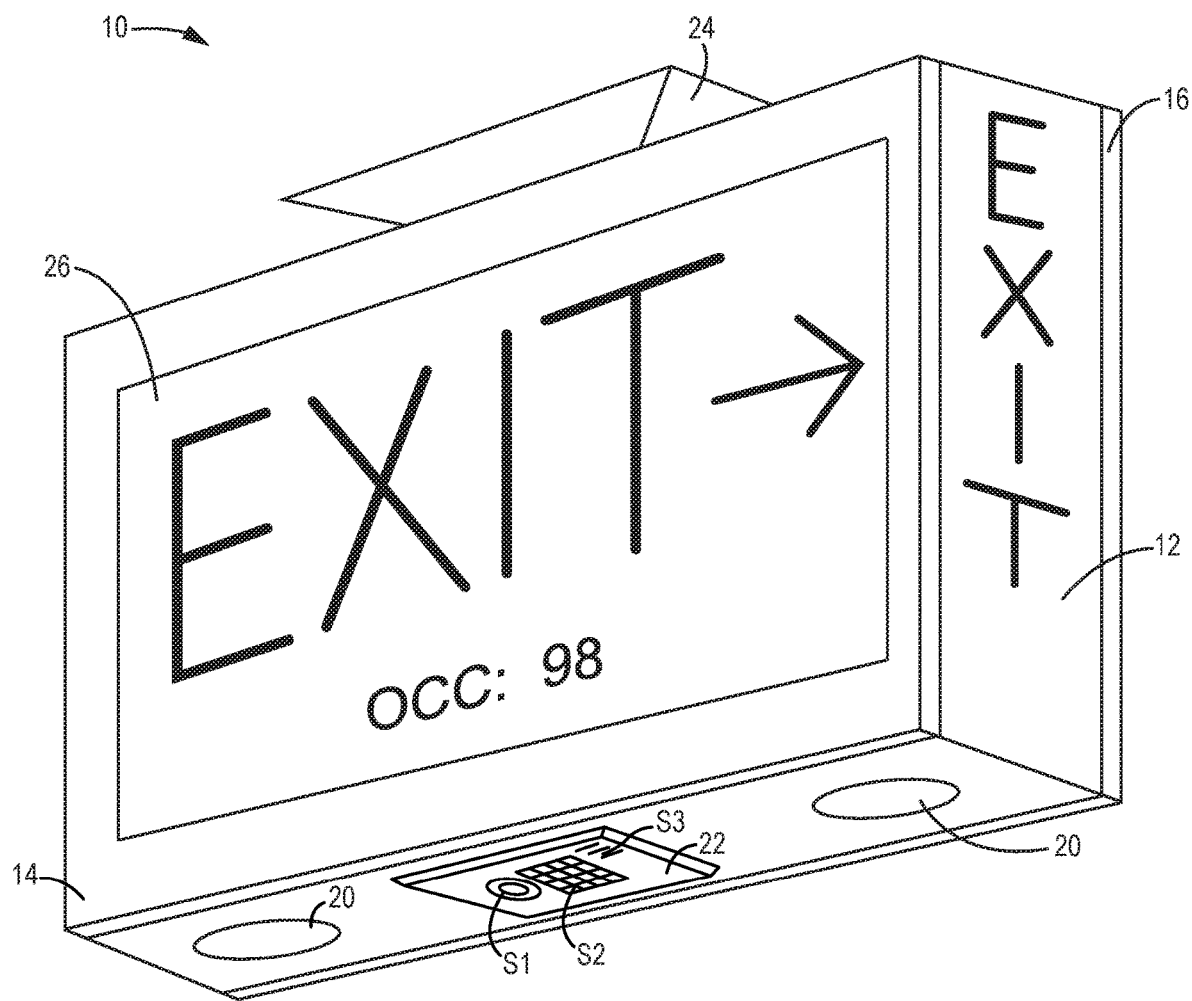
FIG. 4 is an isometric view of an exit sign according to a third embodiment of the disclosure.

The exit sign 10 of FIG. 4 is one in which the display 26 takes up substantially the entire usable portion of the front panel 14. In this embodiment, even the main text (i.e. "EXIT") is displayed on the display 26 along with any other desired information, such as a direction arrow and the currently occupancy count. Notably, the internal light source 36 may be separate from or part of the display 26. Further, the internal light source 36 may represent the actual text or graphics elements of the exit sign 10, lighting the illuminated text or graphics that are printed or etched into the exit sign 10, the pixels or backlighting of the display 26, and the like.

Figure 5:
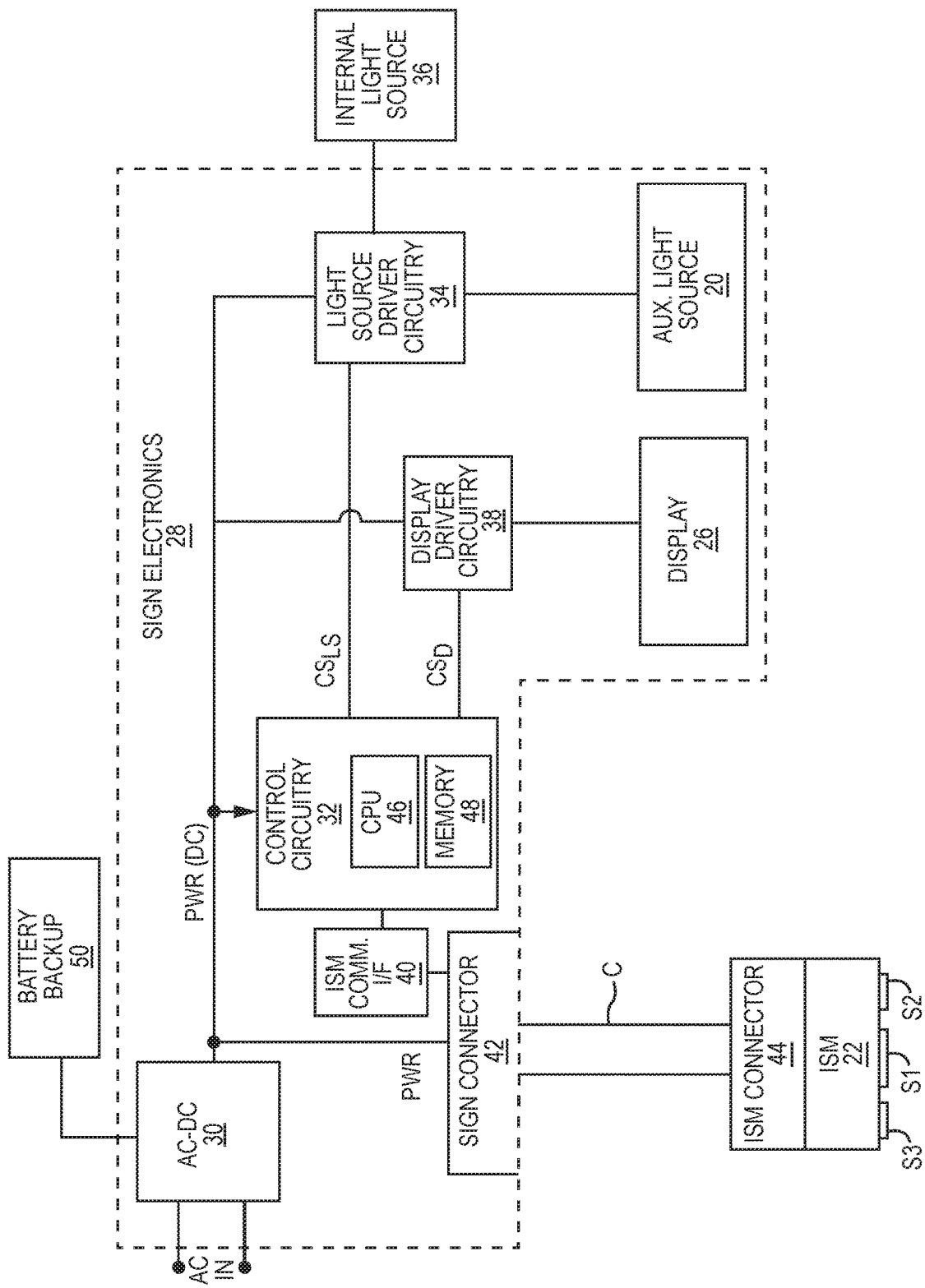
FIG. 5 is a schematic of one embodiment of the sign electronics of an exit sign.

As indicated above, the exit sign 10 will include electronics, which are referred to herein in general as sign electronics 28. FIG. 5 provides an exemplary schematic of the sign electronics 28 according to one embodiment. The sign electronics 28 may include AC-DC conversion circuitry 30, control circuitry 32, light source driver circuitry 34, an internal light source 36, display driver circuitry 38, the display 26, and an ISM communication interface (I/F) 40.

The AC-DC conversion circuitry 30 is configured to receive an AC power signal (AC IN), rectify the AC power signal, correct the power factor of the AC power signal, and provide a DC power signal (PWR). The DC power signal may be used to directly or indirectly power the control circuitry 32 and any other circuitry provided in the sign electronics 28, control circuitry 32, light source driver circuitry 34, internal light source 36, display driver circuitry 38, display 26, and ISM communication interface 40.

The DC power signal may also be provided to a sign connector 42 to power the ISM 22 via appropriate cabling C, which extends from the sign connector 42 to an ISM connector 44, which may be mounted to or in virtually any part of the exit sign 10, such as the bottom face 18 of the central body 12, as illustrated in FIG. 1. In one embodiment, the ISM connector 44 is configured to releasably engage the ISM 22. When the cabling C is connected, and the ISM 22 is engaged with the ISM connector 44, the ISM 22 can receive the DC power signal as well as communicate bidirectionally with the control circuitry 32 of the sign electronics 28 via the ISM communication interface 40 using proprietary or standard communication protocols. In other embodiments, the ISM 22 or sensors associated with ISM 22 or exit sign 10 may be physically separate from the main body of the exit sign 10 and connected via cable whip. Using the whip affords more flexibility for placing and orienting the sensors. For example, certain applications of an image sensor may work better with the image sensor spaced apart from the exit sign 10, oriented in a horizontal or vertical orientation, moved away from a window, and the like. Further, the ISM 22 may be placed in or on any part or panel of the exit sign 10 and oriented vertically, horizontally, or at any angle therebetween.

The internal light source 36 may represent internal or external lighting that is used to help illuminate the information provided on the exit sign 10. The internal light source 36 is driven by the light source driver circuitry 34. The light source driver circuitry 34 may also be used to drive the auxiliary light source 20. The light source driver circuitry 34 will drive the internal light source 36 and the auxiliary light source 20 based on one or more control signals, such as a light source control signal $CS_{LS}$, which are provided by the control circuitry 32. Similarly, the display driver circuitry 38 will drive the display 26 based on one or more display control signals $CS_D$, which are provided by the control circuitry 32. The relative intelligence provided by the control circuitry 32 will depend on the capabilities of the ISM 22 or other control mechanism. On one end of the spectrum, the control circuitry 32 will simply control the internal light source 36, auxiliary light sources 20, and/or display 26 based on instructions provided by the ISM 22. On the other end of the spectrum, the control circuitry 32 may simply use the ISM 22 to facilitate communications with other devices and retrieve sensor information from the sensors S1, S2, S3 provided by the ISM 22. While the allocation of control may vary greatly between the control circuitry 32 of the sign electronics 28 and the ISM 22, the embodiments described below assume that the ISM 22 is the primary control entity associated with the exit sign 10.

With continued reference to FIG. 5, the exit sign 10 may also include a battery backup 50. When the main AC signal is lost, the AC-DC circuitry 30 will effectively switch to the battery backup 50 for providing power to the various sections of the sign electronics 28. The control circuitry 32 will be able to detect when the AC signal is lost and the battery backup 50 is being used, and will control operation in a defined manner in light of the lack of AC power. The control circuitry 32 has an associated central processing unit (CPU) 46 and memory 48, which contains the requisite software instructions and data to facilitate operation as described herein.

In one embodiment, the exit sign 10 is configured to help extend the life of the battery backup when power from the main power source fails, by dimming the output level of the internal light source 36 from a first level to a second level when the main power source fails, following a period of time after the main power source fails, once the battery backup 50 drops to a certain charge level, and the like. The second output level may be fixed or variable.

As such, when power is provided by the AC power source, the exit sign may control the internal light source 36 to output light at a first output level. When the exit sign 10 determines that power is not provided by the AC power source, the exit sign 10 will control the internal light source 36 to output light at a second output level, which is different from the first output level, when the power failure is detected, at a time after the power failure is detected, when the battery backup's charge level drops to a defined level, etc.

Figure 6:
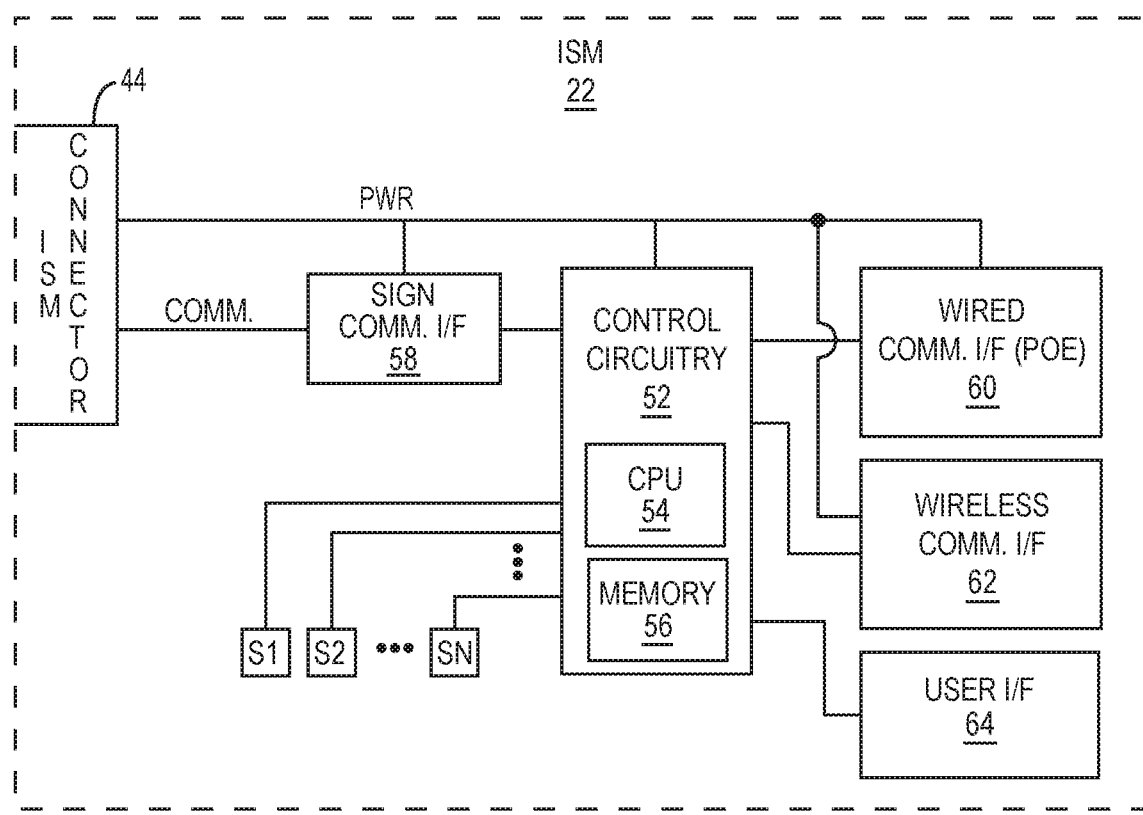
FIG. 6 is a schematic of an intelligent sensor module according to one embodiment of the disclosure.

With reference to FIG. 6, a block diagram of one embodiment of the ISM 22 is illustrated. The ISM 22 includes control circuitry 52 having an associated CPU 54 and memory 56, which contains the requisite software instructions and data to facilitate operation as described herein. The control circuitry 52 may be associated with a sign communication interface 58, which is to be coupled to the sign electronics 28, directly or indirectly via the ISM connector 44. The control circuitry 52 may be associated with a wired communication interface 60, a wireless communication interface 62, or both, to facilitate wired or wireless communications with other lighting fixtures, and/or remote entities, which will be described in further detail below. The wireless communication interface 62 may include the requisite transceiver electronics to facilitate wireless communications with remote entities using any number of wireless communication protocols. The wired communication interface 60 may support universal serial (USB), Ethernet, digital addressable lighting interface (DALI) or like interfaces using any number of wired communication protocols.

In one embodiment, the ISM 22 may receive power in the form of a DC signal from the sign electronics 28 via the ISM connector 44 and facilitate communications with the sign electronics 28 via the sign communication interface 58 and the ISM connector 44. Communications with other lighting fixtures and/or remote entities may be facilitated via the wired and/or wireless communication interfaces 60, 62.

In an alternative embodiment, the ISM 22 may receive power in the form of a DC power signal via the wired communication interface 60, which may be configured as a power over Ethernet (PoE) interface. The DC power signal received via the wired communication interface 60 is used to power the electronics of the ISM 22 and is passed to the sign electronics 28 via the ISM connector 44. The sign electronics 28 could use the DC power signal to power all or a portion of the sign electronics 28.

As noted, the ISM 22 includes multiple integrated sensors S1-SN, which directly or indirectly couple to the control circuitry 52. The sensors S1-SN may include, but are not limited to, one or more ambient light, occupancy (motion), sound, temperature, humidity, pressure, vibration, carbon monoxide, carbon dioxide, air quality, smoke, power, image, or like sensors. The sensors S1-SN provide sensor data to the control circuitry 52. Based on internal logic, the ISM 22 may share the sensor data with the sign electronics 28 as well as other lighting fixtures or remote entities. In certain embodiments where the ISM 22 provides primary control of the exit sign 10, the control circuitry 52 may also determine how the sign electronics 28 should function based on the sensor data and/or any other data or instructions received from other lighting fixtures or remote entities. Based on how the sign electronics 28 should function, the ISM 22 will generate and send appropriate instructions to the sign electronics 28 via the sign communication interface 58 and the ISM connector 44. The sign electronics 28 will then function based on the instructions received from the ISM 22.

In addition to controlling the sign electronics 28, the ISM 22 may play an important role in coordinating intelligence and/or sharing data among the lighting fixtures in a lighting network, which will be described below. In addition to receiving data and instructions from other lighting fixtures or remote control entities and using such information to control the sign electronics 28, the ISM 22 may also provide instructions and information to other lighting fixtures and remote control entities based on the sensor data from its integrated sensors S1-SN as well as the sensor data and instructions received from the other lighting fixtures and remote control entities.

The ISM 22 may have a user interface 64 that provides information related to the state or operation of the ISM 22, allows a user to manually provide information to the ISM 22, or a combination thereof. As such, the user interface 64 may include an input mechanism, an output mechanism, or both. The input mechanism may include one or more of buttons, keys, keypads, touchscreens, microphones, or the like. The output mechanism may include one more LEDs, a display, or the like. For the purposes of this application, a button is defined to include, but is not limited to a push button switch, all or part of a toggle switch, rotary dial, slider, or any other mechanical input mechanism.

Figure 7A:
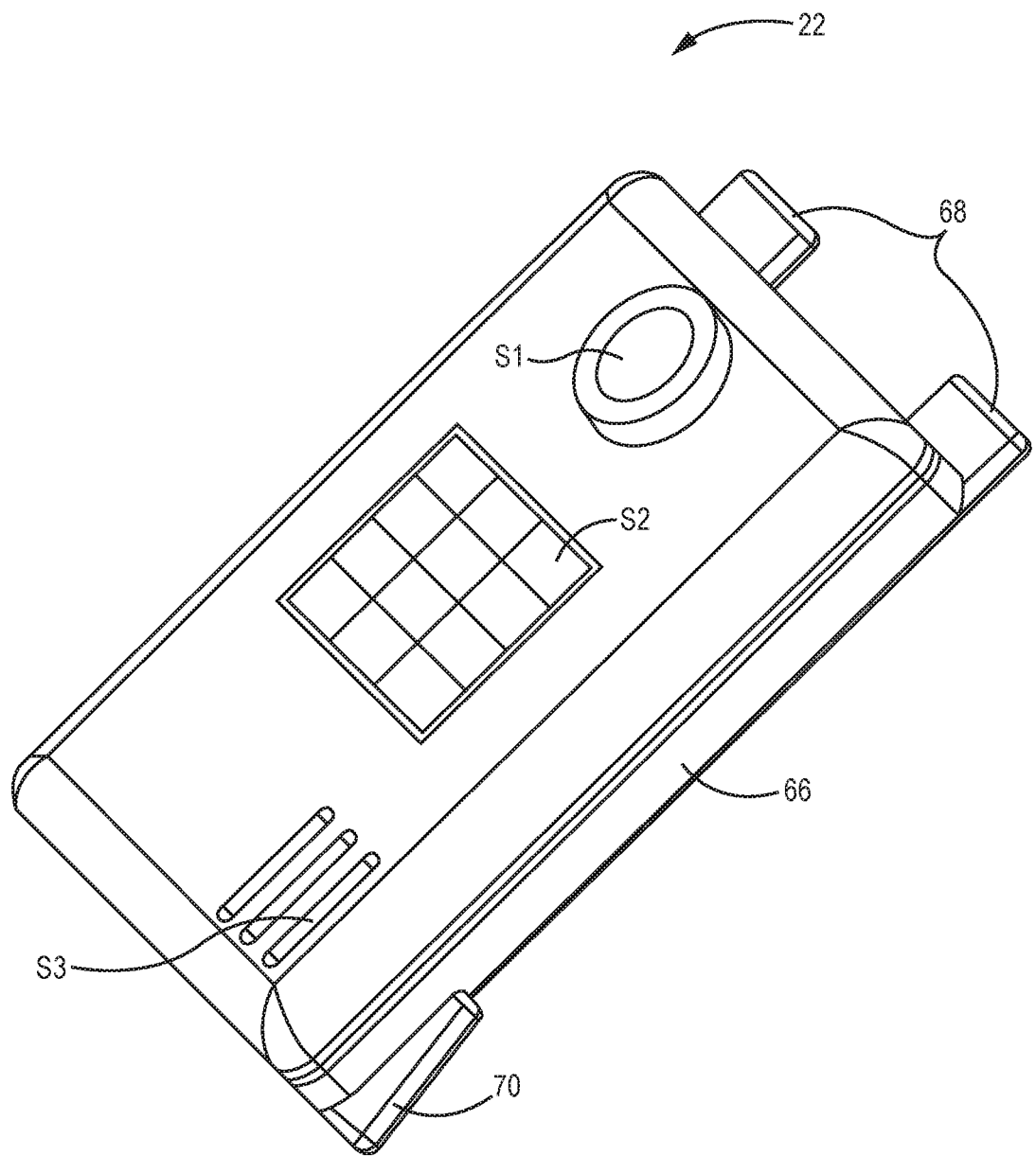
FIG. 7A is a top isometric view of an intelligent sensor module (ISM) according to a first embodiment of the disclosure.
Figure 7B:
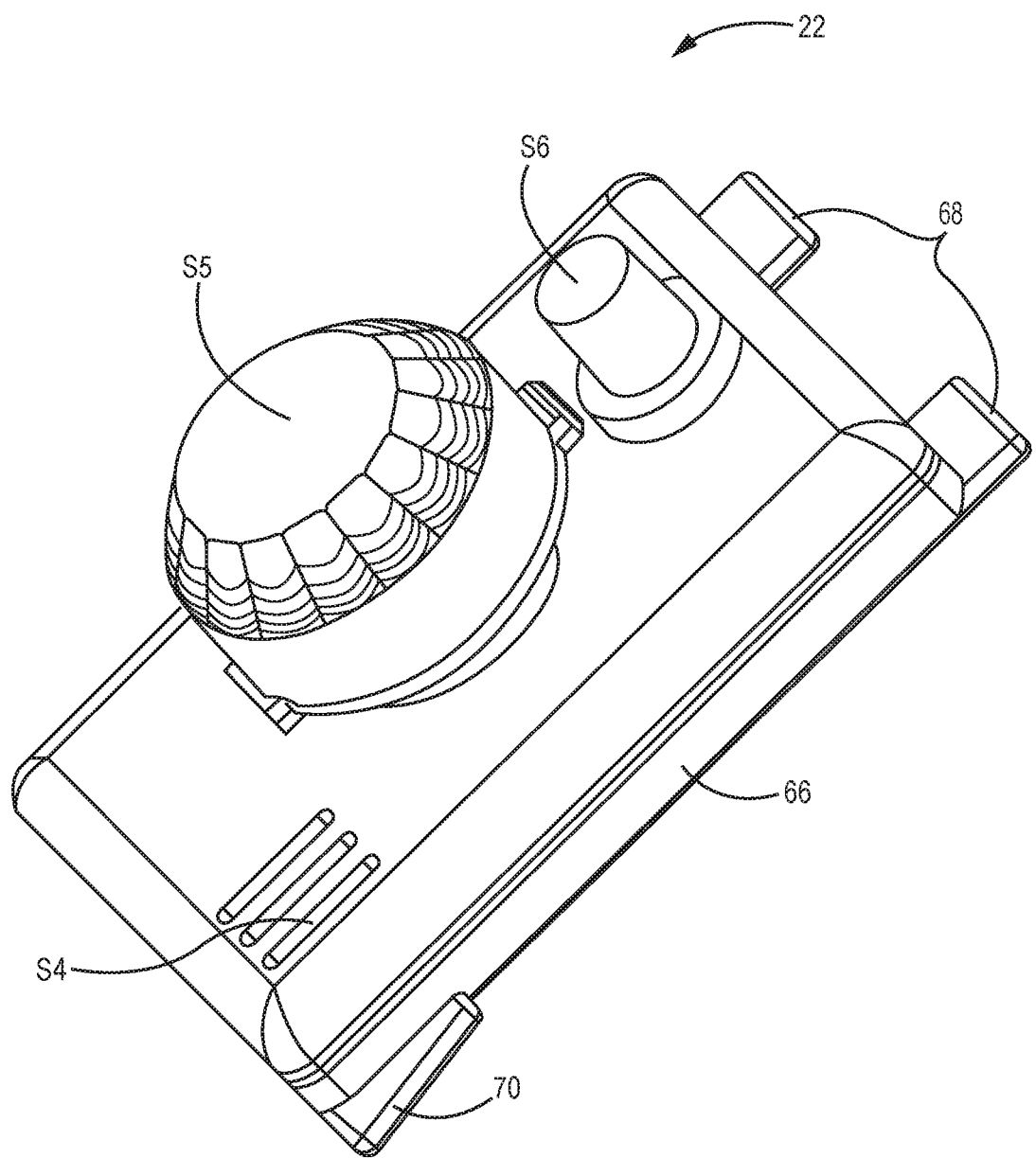
FIG. 7B is a top isometric view of an ISM according to a second embodiment of the disclosure.

A first exemplary ISM 22 is illustrated in FIG. 7A. The ISM 22 has a housing 66 in or on which sensors S1, S2, and S3 and the electronics described above are mounted. In this particular but non-limiting embodiment, sensor S1 is a vibration sensor, sensor S2 is an image sensor, and sensor S3 is a microphone mounted behind three openings that are provided in the housing 66, wherein the image sensor S2 may be configured and used to monitor ambient light, detect occupancy, collect images and/or video, recognize people and/or objects, determine the speed and/or direction of travel for people and/or objects and the like. FIG. 7B illustrates another sensor configuration for the ISM 22 that includes an carbon dioxide sensor S4, an occupancy sensor S5, and an ambient light sensor S6.

Figure 8:
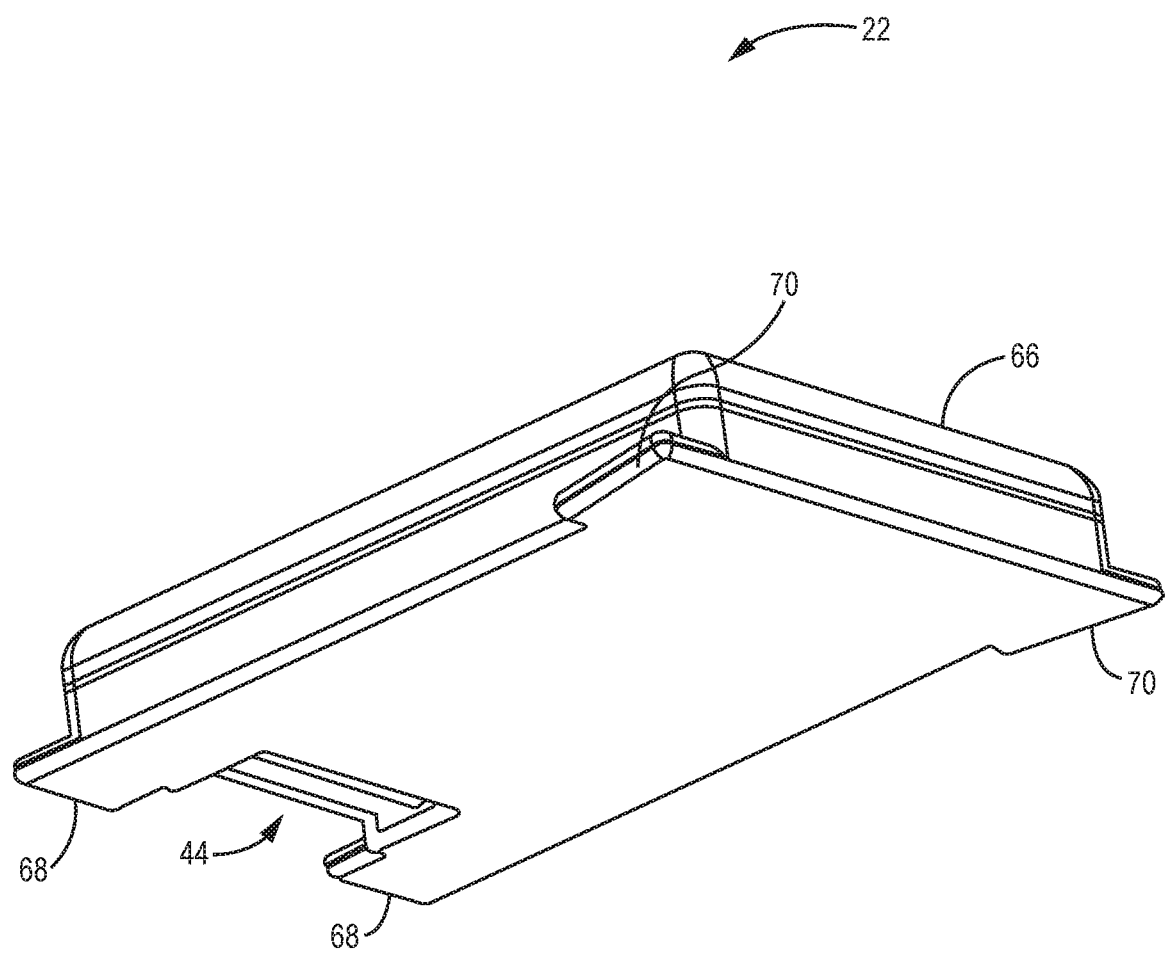
FIG. 8 is a bottom isometric view of an ISM according to the embodiment of FIG. 7A.

In this instance, the housing 66 of the ISM 22 is configured to releasably engage a compatible cradle (not shown) or the like provided by the exit sign 10 in a snap-fit manner. As illustrated in FIGS. 7A, 7B, and 8, the housing 66 may include two front tabs 68 that extend outward from a bottom portion of the front wall of the housing 66. Further, opposing side tabs 70 extend outward from bottom portions of opposing side walls of the housing 66. The side tabs 70 are biased toward the rear wall of the housing 66.

Figure 9:
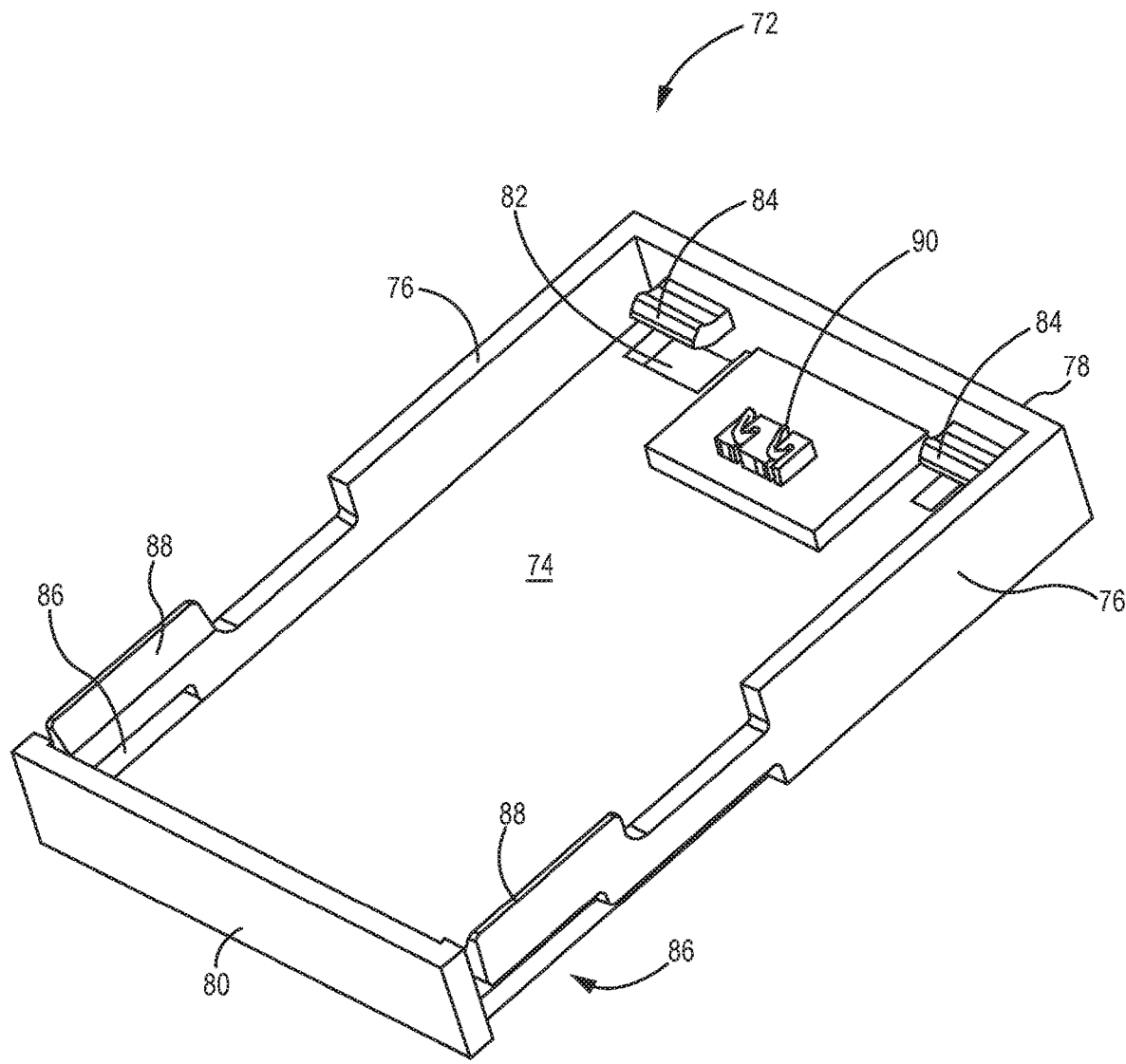
FIG. 9 is a top isometric view of a cradle for receiving the ISM of FIG. 7A according to one embodiment of the disclosure.

FIG. 9 illustrates an exemplary cradle 72, which is configured to receive the ISM 22 of FIG. 7A or 7B. The cradle 72 may be integrated into a portion of the exit sign 10, such as the bottom face 18 of the central body 12 or other structural member of the exit sign 10. The cradle 72 may be a separate component that is mounted on or within the structural members, or the structural members may be modified to integrally provide the cradle 72.

The cradle 72 is defined by a bottom wall 74, two opposing side walls 76, a front wall 78, and a rear wall 80. The opposing sidewalls 76, the front wall 78, and the rear wall 80 are perpendicular to and extend from the perimeter of the bottom wall 74. The bottom wall 74 includes two front openings 82 adjacent to and potentially extending into the front wall 78. Two front wings 84 extend inward from the front wall 78 and reside directly above the corresponding front openings 82. As illustrated further below, the front openings 82 temporarily receive the front tabs 68 of the ISM 22 as the ISM 22 is being inserted into the cradle 72. The front tabs 68 of the ISM 22 are designed to slide below the bottom sides of the front wings 84. Each side wall 76 has a side opening 86 adjacent a side spring tab 88. The side openings 86 are configured to receive the side tabs 70 of the ISM 22. The side spring tabs 88 are designed to spring outward enough to allow the side tabs 70 of the ISM 22 to reach the side openings 86, when the ISM 22 is placed into the cradle 72. Details are provided further below.

A cradle connector 90 is provided on the bottom wall 74 of the cradle 72 and will provide an electrical connection with the ISM connector 44 of the ISM 22, once the ISM 22 is positioned in the cradle 72. Appropriate cabling or another connector mechanism will provide the necessary electrical connections between the cradle connector 90 and the sign connector 42 of the sign electronics 28, such that the requisite electrical connections between the ISM 22 and the sign electronics 28 are provided.

Figure 10:
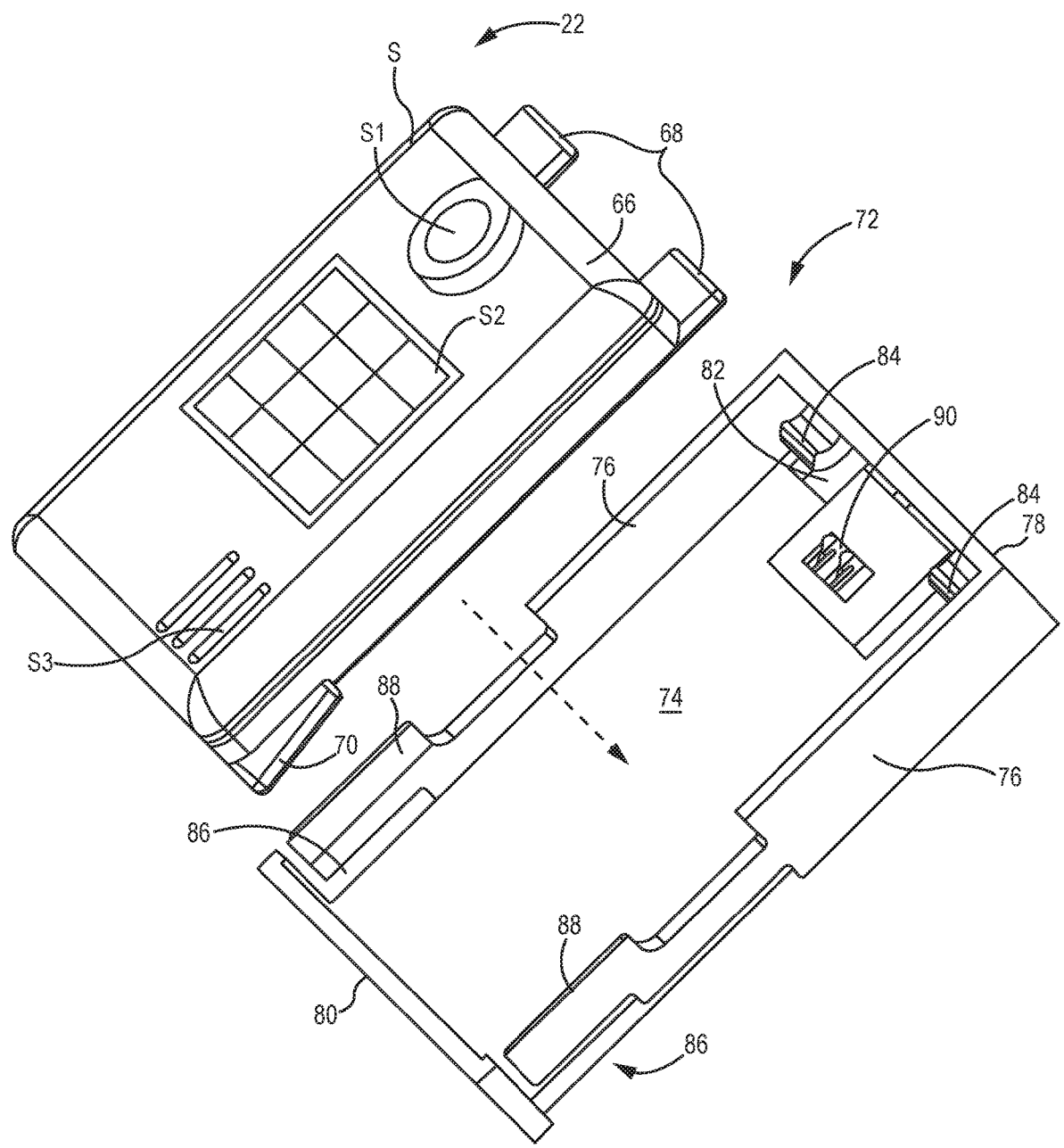
FIG. 10 illustrates the ISM prior to being inserted into the cradle according to one embodiment of the disclosure.
Figure 11:
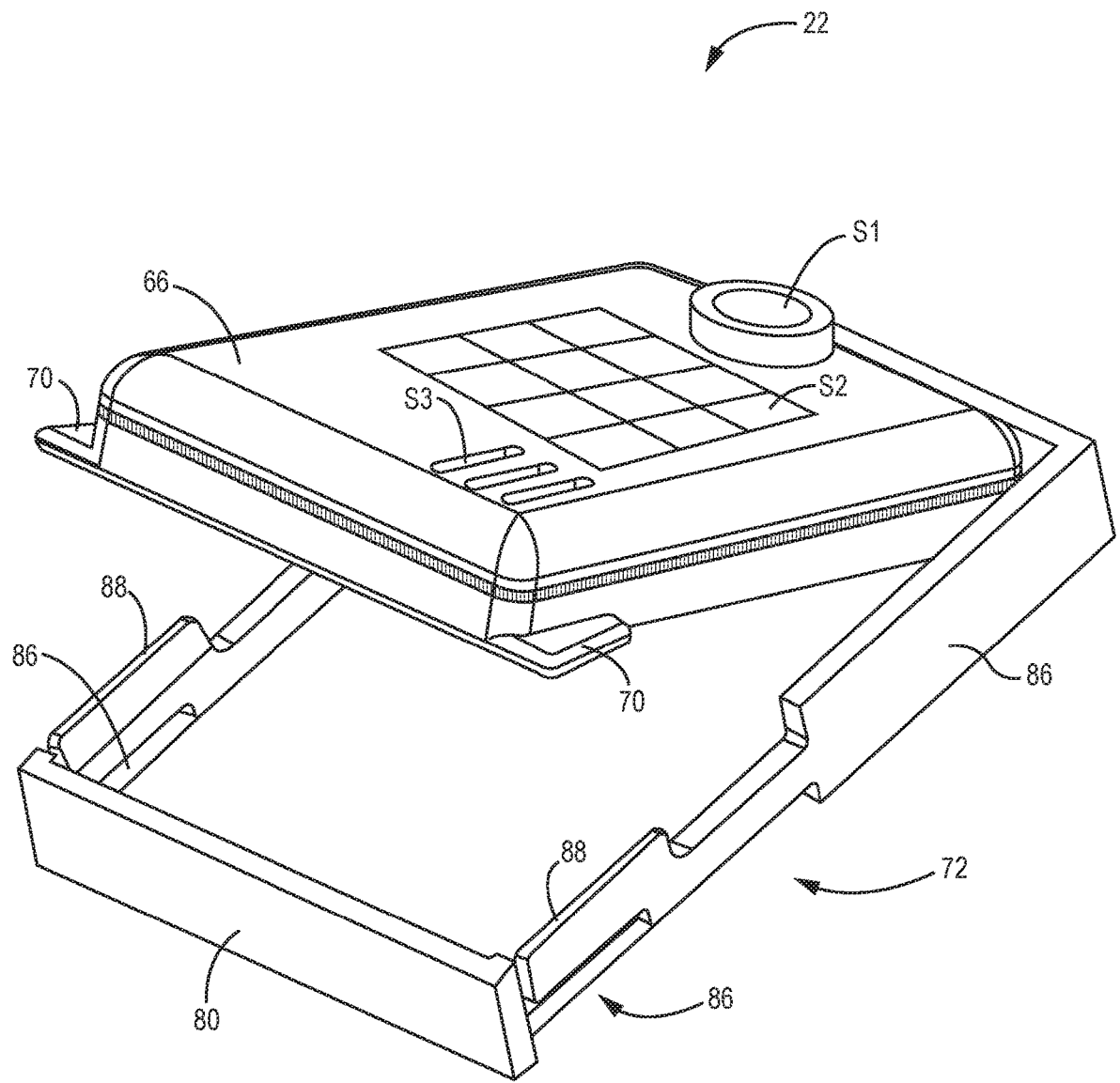
FIG. 11 illustrates the ISM partially inserted into the cradle according to one embodiment of the disclosure.

FIG. 10 illustrates the ISM 22 positioned above the cradle 72 prior to the ISM 22 being inserted into the cradle 72. FIG.

Figure 12:
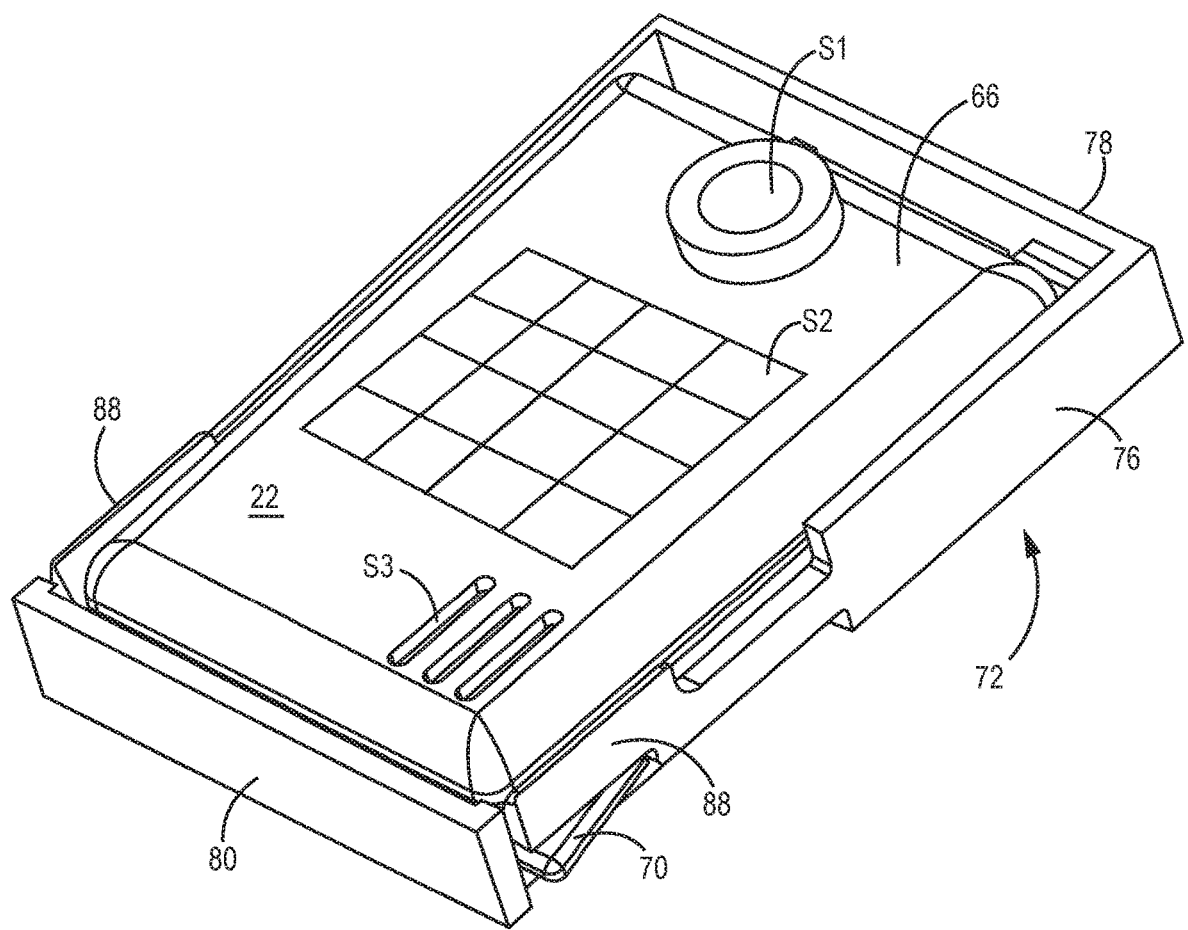
FIG. 12 illustrates the ISM fully inserted into the cradle according to one embodiment of the disclosure.

11 illustrates the ISM 22 being inserted into the cradle 72. At this point, the ISM 22 is angled relative to the cradle 72, and the front tabs 68 of the ISM 22 are respectively inserted into the front openings 82 and below the front wings 84 of the cradle 72. The rear portion of the ISM 22, including the side tabs 70, have not yet engaged the cradle 72. FIG. 12 illustrates the ISM 22 fully inserted into the cradle 72. As the rear of the ISM 22 is inserted into the cradle 72, the side spring tabs 88 provided by the sidewalls 76 will flex outward to allow the side tabs 70 of the ISM 22 to slide by the side spring tabs 88 and reach the side openings 86. Once the side tabs 70 reach the side openings 86, the side spring tabs 88 of the sidewalls 76 will return to their normal position, wherein the side tabs 70 of the ISM 22 are confined between the bottom surfaces of the side spring tabs 88 and a top surface of the bottom wall 74. Further, the front tabs 68 of the ISM 22 are confined between the bottom surfaces of the front wings 84 and the top surface of the bottom wall 74. As a result, the ISM 22 is securely engaged in the cradle 72.

Figure 13:
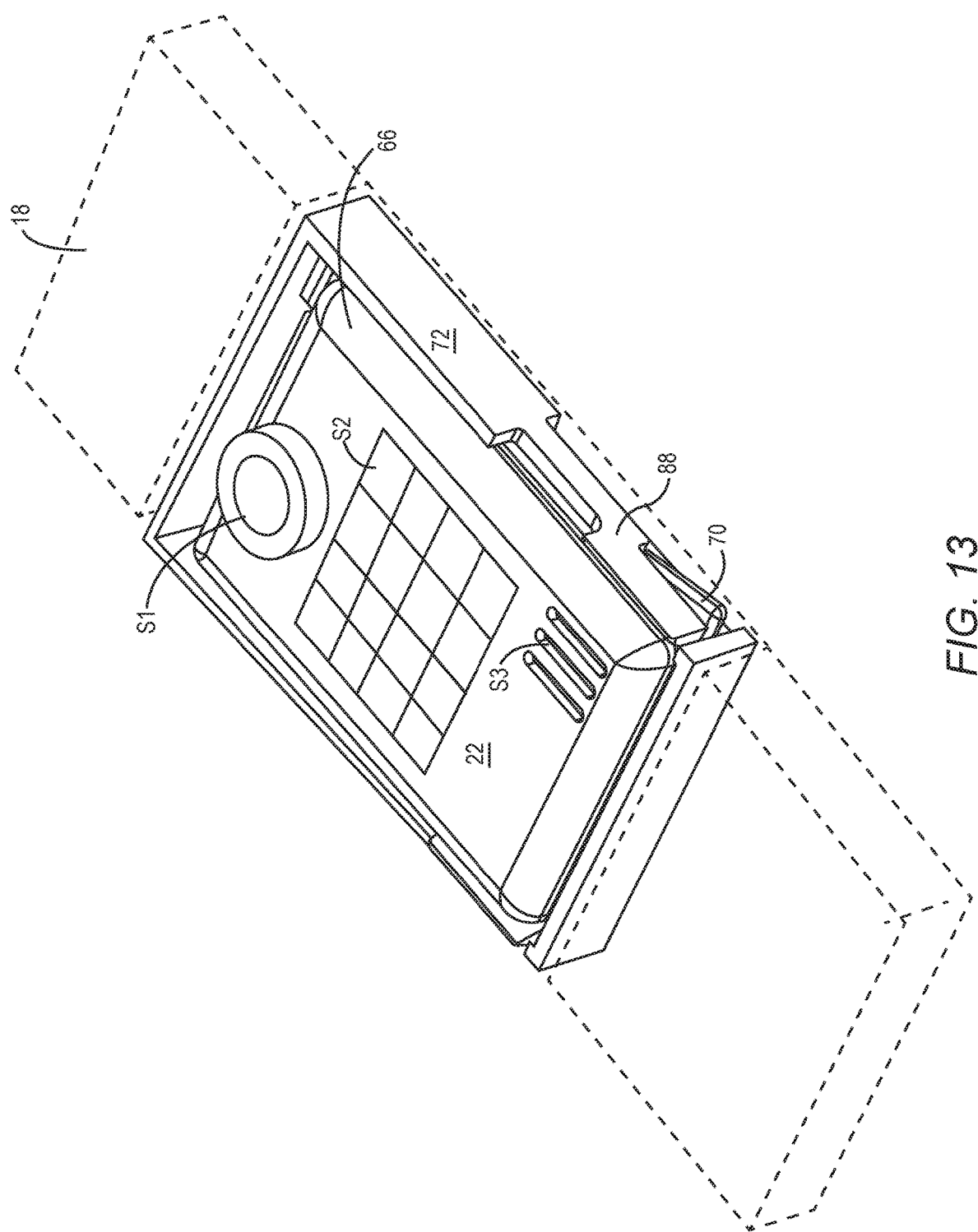
FIG. 13 illustrates a cradle integrated within the bottom face of a central body of an exit sign according to one embodiment of the disclosure.

The ISM 22 may be removed from the cradle 72 by springing the side spring tabs 88 of the cradle 72 outward to release the side tabs 70 of the ISM 22 and pulling the ISM 22 from the cradle 72. FIG. 13 illustrates the cradle 72 mounted within the bottom face 18 of the central body 12 of the exit sign 10 and the ISM 22 mounted within the cradle 72. As noted above, the cradle 72 may be provided in a separate or integrated fashion anywhere on the exit sign 10. Generally, the cradle 72 is provided such that all or at least some of the sensors S1-SN are exposed to the same environment in which the exit sign 10 is normally visible. In the illustrated embodiment, the cradle 72 is configured so that the ISM 22 is exposed to the environment that is that is visible, and as such, the ISM 22 is easily removed from the cradle 72 once the exit sign 10 is installed in, on, or from a ceiling, wall, or like structure. A new ISM 22 is likewise easily installed in the cradle 72, since the cradle 72 is exposed to the environment once the exit sign 10 is installed.

As such, a significant benefit associated with the ISM 22 includes the relative ease with which the functionality of the exit sign 10 can be updated by simply replacing one ISM 22 with another. For example, assume the exit sign 10 is originally supplied with an ISM 22 with only two sensors, which are configured to sense ambient light and occupancy, respectively. As such, the exit sign 10 is limited to being able to sense ambient light and occupancy. Further assume that there is a desire to upgrade exit sign 10 to not only sense ambient light and occupancy, but also sense vibration and monitor audio in the associated environment. The original ISM 22, which may only include an ambient light sensor and an occupancy sensor, may be easily replaced with a new ISM 22, which includes an image sensor to provide ambient light sensing and an occupancy sensing, a pressure sensor, and a vibration sensor. The new control circuitry 52 of the ISM 22 is configured to handle the new sensors and will control the driver module 28 of the exit sign 10 based on its own internal logic. An ISM 22 may also be replaced with a new ISM 22 simply to provide upgraded sensors, wherein the sensing capability is the same. For example, an ISM 22 with a less sensitive and less accurate occupancy sensor may be replaced with an ISM 22 with a more sensitive and more accurate occupancy sensor. As a result of configuring the ISM 22 as described above, the sign electronics 28 effectively appear as an interchangeable peripheral to the ISM 22.

When an ISM 22 in an exit sign 10 is replaced, the new ISM 22 may communicate with the other lighting fixtures or remote entities in an associated lighting network and/or subgroup thereof as a new exit sign 10 or a replacement exit sign 10, depending on the desires of the lighting designer. When the new ISM 22 joins the lighting network and/or subgroup thereof, the new ISM 22 will report its capabilities to the other lighting fixtures or remote entities, facilitate any necessary handshaking, and begin operating and/or sharing data based on its new capabilities. Notably, the multiple exit signs 10 may be grouped together alone or as part of a larger lighting network or subgroup thereof. In alternative embodiments, the functionality of the control circuitry 52 of the ISM 22 may be implemented in the control circuitry 32 of the sign electronics 28, and vice versa.

Figure 14:
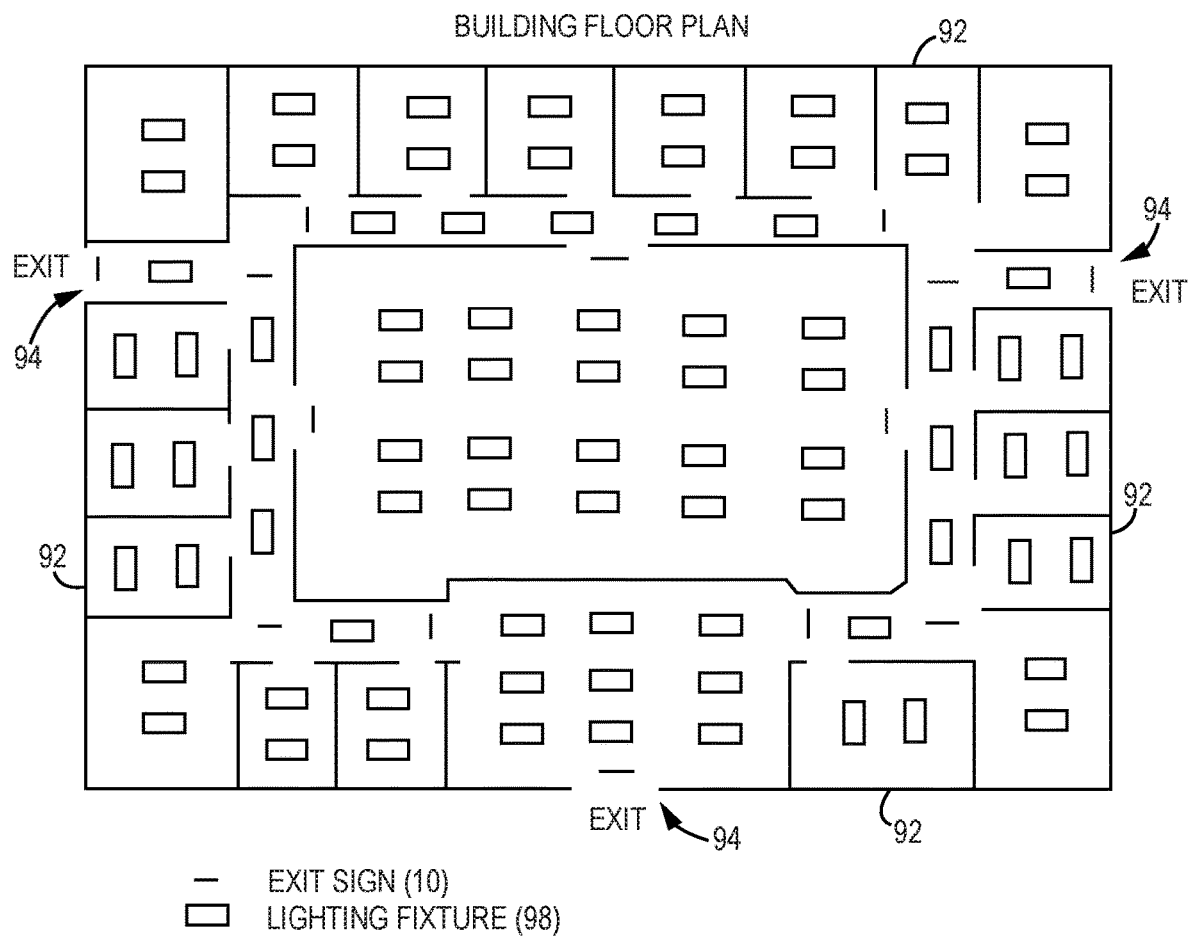
FIG. 14 is an exemplary building floor plan according to one embodiment of the disclosure.

Turning now to FIG. 14, a floor plan for a building is illustrated wherein exit signs 10 are provided at the exits of the building as well as at strategic locations that lead to the exits of the building in traditional fashion. The building is shown with multiple rooms confined by an exterior wall 92, which has doors 94 at the various exits. Also illustrated are numerous lighting fixtures 98, which are spread throughout the hallways and rooms of the building. As described further below, lighting fixtures 98 may form part of a lighting network, which may incorporate the exit signs 10 such that the exit signs 10 and lighting fixtures 98 may communicate with one another, share information with one another, control one another, and the like.

Figure 15:
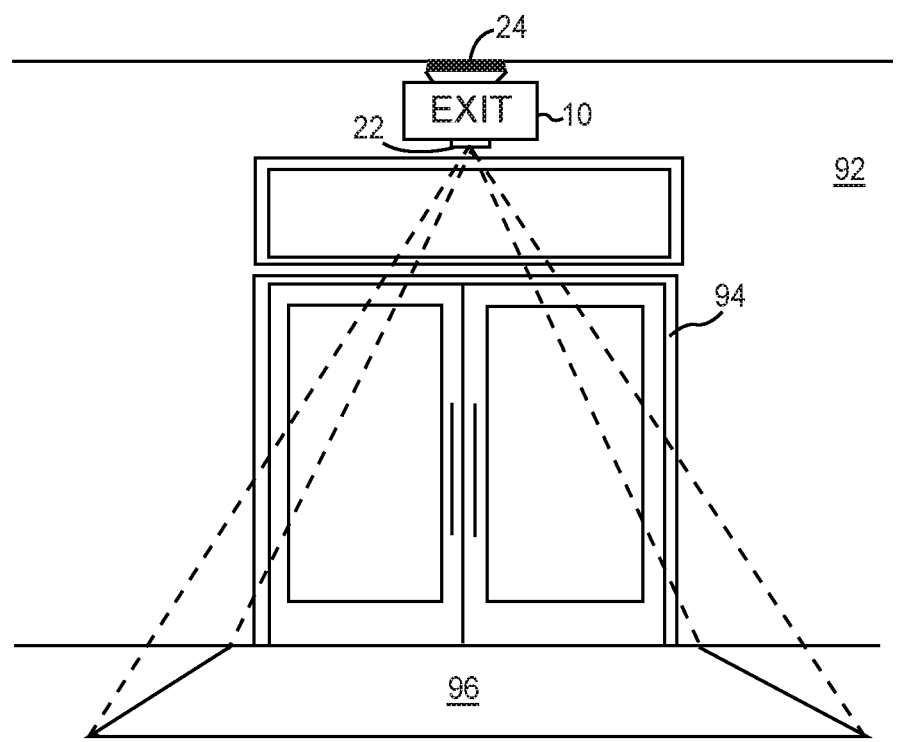
FIG. 15 illustrates a front door assembly and area of a building according to one embodiment of the disclosure.

FIG. 15 illustrates an exemplary door 94 in an exterior wall 92, wherein an exit sign 10 is mounted to the exterior wall 92 or on the ceiling in close proximity to the door 94. As illustrated, the exit sign 10 is equipped with the ISM 22, which has one or more sensors. In this example, the ISM 22 includes an occupancy sensor or an image sensor, which may function as an occupancy sensor as well as identify, track, and/or count the number of occupants in the building. The sensors will generally be associated with a sensor coverage area 96, which corresponds to the area in which the characteristic being sensed can be sensed. For the more sophisticated functions provided by the exit sign 10, the various exit signs 10 within the building may be in communication with one another, with one or more lighting fixtures 98, or with other control entities associated with the exit sign 10, lighting fixtures 98, or a lighting network in general.

An exemplary lighting network 100 is illustrated in FIG. 16. In this instance, the lighting network 100 includes numerous lighting fixtures 98 and exit signs 10. The lighting network 100 may be wired or wireless, or a combination thereof, using any number of communication platforms. For example, the lighting fixtures 98 and the exit signs 10 may act as network nodes, which are capable of routing and/or forwarding information from one entity to another throughout the lighting network 100 via wired or wireless connectivity.

The lighting network 100 may be coupled to a local area network (LAN) 104, which is provided within the building. Further, the LAN 104 may be coupled to a wide area network (WAN) 106, such as the internet or other proprietary network. Control for the various entities in the lighting network 100 may be provided remotely via a remote control system 102, which resides on the WAN 106 or LAN 104. Other control entities may couple more directly to the lighting network 100. These control entities may control wall controllers 108, local sensors (not shown), which are not directly associated with the lighting fixture 98 or exit sign 10, mobile devices 110, such as dedicated control devices or mobile terminals, as well as other local control systems 112, such as a dedicated lighting or building management system. The lighting network 100, LAN 104, and/or WAN 106 may be implemented using different types of wired and/or wireless networks and networking technologies. Non-limiting wireless examples include Bluetooth, Bluetooth Mesh, IEEE 802.15.4, Lightweight Mesh, Zigbee, ZWave, Zigbee Light Link (ZLL), IEEE 802.11 of all types (i.e. a/b/g/n/ac/ah/s, etc), other Wi-Fi, LoRa (low power WAN), Cellular 3G/4G/5G, Long Term Evolution (LTE), light fidelity (Li-Fi), and the like. Non-limiting wired examples include power over Ethernet (PoE), Ethernet, RS-485, controller area network (CAN), digital addressable lighting interface (DALI), process field bus (Profibus), building automation and control network (BACnet), direct link interface (DLI), digital multiplex (DMX), universal serial bus (USB), power line communications (PLC) and the like.

In one embodiment, the various entities of the lighting network 100 will automatically discover one another and join the network in their functional capacity, such that each of the entities, or the applicable control systems are aware of the presence and participation of the entities in the lighting network 100. Similarly, when new entities are provided in the building, the entity may discover the lighting network 100 and join the lighting network 100 in its functional capacity. The formation of the lighting network 100 and joining the lighting network 100 may also be facilitated in a manual fashion.

Once the lighting network 100 is formed, assigning the various entities to logical subgroups is beneficial. For example, grouping the lighting fixtures 98 and the wall controllers 108 for each room and hallway is beneficial. This enables the wall controller 108 to control just the associated lighting fixtures 98. When the lighting fixtures 98 are associated with various sensors, the sensor information within a subgroup may be shared and used to control the lighting within that subgroup. For example, when the occupancy sensor of one lighting fixture 98 within a subgroup detects occupancy, that lighting fixture 98 may instruct the other lighting fixtures 98 to turn on in response to the detection of the occupancy event. Similarly, if the wall controller 108 detects a manual instruction to turn off the lighting fixtures 98 within the subgroup, the wall controller 108 may instruct the lighting fixtures 98 in the associated subgroup to turn off. For further information on assigning lighting fixtures 98 and associated entities to subgroups and the operation of the subgroups, reference is made to U.S. Pat. Nos. 9,155,165; 8,975,827; 9,155,166; 9,433,061; 8,829,821; 9,572,226; 9,795,016; 8,912,735; 9,706,617; 9,717,125; 9,723,673; 9,723,696; and 9,826,598; and U.S. patent application Ser. Nos. 14/497,568 filed Sep. 26, 2017, now U.S. Pat. No. 9,991,399; 14/498,168 filed Sep. 26, 2017, now U.S. Pat. No. 9,872,367; 15/191,753 filed Jun. 24, 2016, now U.S. Pat. No. 10,306,738; 15/192,035 filed Jun. 24, 2016, now U.S. Pat. No. 10,251,245; 15/192,308 filed Jun. 24, 2016, and published Aug. 10, 2017, as U.S. Pat. Publication No. 2017/0230364A1; 15/192,479 filed Jun. 24, 2016, now U.S. Pat. No. 10,192,316; 15/621,695 filed Jun. 13, 2017, now U.S. Pat. No. 9,894,740; 15/714,350 filed Sep. 25, 2017, now U.S. Pat. No. 10,172,218; 15/830,406 filed Dec. 4, 2017, now U.S. Pat. No. 10,206,270; and 15/849,986 filed Dec. 21, 2017, now U.S. Pat. No. 10,264,657, the disclosures of which are incorporated herein by reference in their entireties.

For the present disclosure, the exit signs 10 may be treated just like any other lighting fixture 98 or entity of the lighting network 100. For example, all of the exit signs 10 may be grouped into a single subgroup, wherein the exit signs 10 share sensor information with one another, function in a concerted fashion based on the shared information, and the like. Alternatively, the exit signs may be grouped with nearby lighting fixtures 98, wherein the sensors of the ISM 22 are used to gather sensor information for the space associated with the subgroup and the sensor information is shared with the associated lighting fixtures 98. In yet another configuration, the exit signs 10 associated with the exits are provided in one group, while the exits signs 10 associated with the interior portions of the building, such as those that are in the hallways or the doorways of interior rooms, are grouped together in one or more subgroups, wherein the entities within a subgroup share and react to sensor information in a coordinated fashion.

In essence, the exit signs 10 may act as a separate subgroup or an extension of one or more subgroups of a lighting network 100. When equipped with one or more sensors, the exit signs 10 may collect the sensor information and take any number of actions. The exit signs 10 may control their own operation based on the sensor information, control other entities such as the lighting fixtures 98 that are in the associated subgroup or overall lighting network 100, based on the information and/or share the sensor information with the various entities in the subgroup, the overall lighting network 100, and/or local or remote control systems 112, 102.

Further, the exits signs 10 may receive information from the various entities of the lighting network 100 as well as the local and/or remote control systems 112, 102. The information, such as sensor information gathered from other entities, will then allow the exits signs 10 to control their operation based on that information. In this instance, the information is not an instruction, but information that the exit sign 10 takes into consideration when controlling its operation. The information received from the other entities of the lighting network 100 may include specific instructions for operating. In this instance, the exit signs will receive the instructions and control their operation accordingly.

Figure 17A:
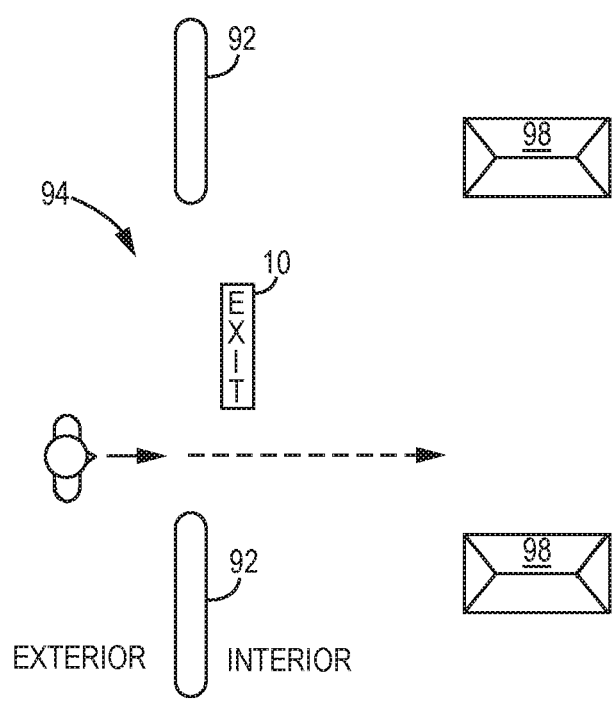
FIG. 17A illustrates a single occupant entering a building according to one embodiment of the disclosure.

Turning now to FIG. 17A, a first non-limiting example is provided. In this instance, assume that a person is entering a building through a door 94, and an exit sign 10 is provided proximate to the door 94. Further assume that the exit sign 10 has an occupancy sensor or image sensor that is used to detect occupancy. In this instance, the exit sign 10, through its ISM 22, detects the person entering the building as an occupancy event, and in response to the occupancy event, sends instructions to the lighting fixtures 98 to turn on. The exit sign 10 may also be configured to track the number of occupants in the building, and as such, will increment its occupancy count and instruct the other exit signs in the building to do the same, such that the exit signs 10 coordinate with one another to track the actual occupancy of the building. The occupancy count and/or occupancy event may be shared with other entities on the lighting network 100, as desired, and need not be restricted to just the subgroup of lighting fixtures 98 that are grouped with the exit sign 10.

The lighting fixtures 98 may also provide occupancy information to the exit sign 10, such that the exit sign 10 and the lighting fixtures 98 coordinate with one another to maintain accurate occupancy counts as well as make sure the lights are on when the area associated with the subgroup is occupied and that the lighting fixtures 98 turn off when the area associated with the subgroup is no longer occupied. The sharing of occupancy information among the entities in a subgroup is important in certain situations because an occupant may be in the area associated with the subgroup, but not detectable by certain entities within the associated subgroup.

Figure 17B:
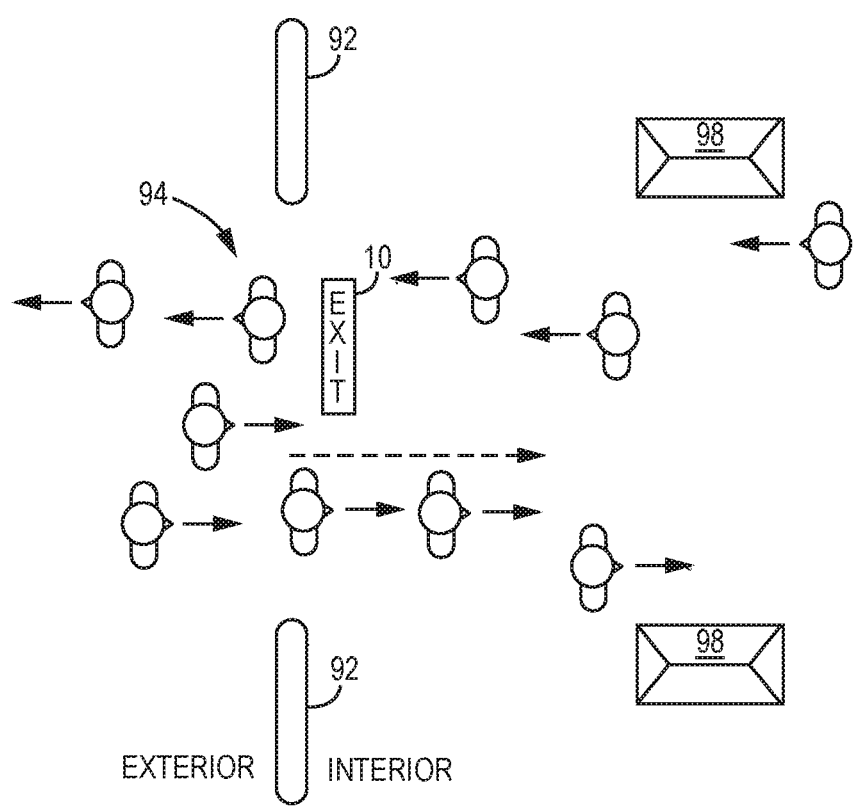
FIG. 17B illustrates multiple occupants entering and exiting a building according to one embodiment of the disclosure.

When the ILM 22 of the exit sign 10 includes an image sensor or other type of sensor with which the direction and the velocity of travel of individual occupants can be determined, precise occupancy tracking and sophisticated control based thereon may be implemented. With reference to FIG. 17B, the exit sign 10 alone or in combination with other lighting fixtures 98 or the like may be able to individually identify and track the direction and velocity of travel for groups of individuals moving in different directions and at different velocities. As such, each exit sign 10 located at a door 94 can track the number of people entering and exiting the building and share this information with the other exit signs 10 and/or control entities. The exit signs 10 may also be capable of analyzing static and dynamic characteristics of the individuals to specifically identify them to enable tracking of the individual throughout the building, and in particular be able to identify when a particular individual entered through one door 94 and exited through another door 94.

Cooperation with the other lighting fixtures 98 may further allow tracking of the individual based on the static and dynamic characteristics throughout the entire building. The static characteristics may include shape, size, color, distinguishing features, and the like, of the person or the clothes they're wearing. The dynamic characteristics may relate to how the individual moves, such as their gait, posture, head, arm, leg, or torso movements, and the like. In one embodiment, the exit sign 10 is capable of gathering enough information to facilitate facial recognition, wherein the actual processing associated with the facial recognition is provided at the exit sign 10 or another entity based on the information gathered at the exit sign 10.

An alternative or additional way of facilitating individual tracking is to provide wireless identification capabilities in the exit sign 10, wherein one of the sensors is an RFID (radio frequency identification) sensor, near field transceiver, Bluetooth transceiver, or the like, which is capable of communicating with an appropriate transponder or electronic device carried by the individual being tracked, such that the exit sign 10 may be used to help detect the entering and exiting of the individual as well as the overall tracking of the individual throughout the building in association with other exit signs 10, lighting fixtures 98, or the like. Notably, any type of sensor and sensing function is benefitted with occupancy knowledge, especially knowing whether an occupant is entering or leaving a building or area within the building. Based on whether or not there are occupants in the building or in a particular area within the building, the relative sensitivity of the sensors may change, certain sensing may be triggered, and certain sensing may be deactivated, based on the presence or absence of occupants in the building or the area within the building. By attracting the direction and velocity of travel of the occupants, sensing may be activated or deactivated as well as sensitivities adjusted based on where an occupant is headed, where they came from, and the like.

When the number of occupants is accurately tracked, the actual number of occupants in the building may be displayed on the exit signs 10, and updated in a dynamic fashion. As such, occupants of the building as well as people outside of the building may have access to the number of occupants within the building at any given time. The display of such information may be controlled as necessary or as desired. For example, the number of occupants in the building may not be visible from the exterior of the building, unless an emergency condition has been detected. For example, if there is a hostage situation or a fire in the building, the exit sign 10 may display the number of occupants in such a way that it is visible from the exterior in an effort to alert authorities, such as police officers and/or firefighters. Such occupancy information may also be passed to the authorities by the remote control system 102 via the LAN 104 and WAN 106.

Having an intelligent exit sign 10 that has one or more sensors and is capable of interacting with the lighting network 100 opens up innumerable control and automation opportunities. FIGS. 17C and 17D illustrate the benefits of tying the exit sign 10 into door control mechanisms DC. Many doors 94 are automated in that they remain locked until someone is approaching them from the interior or they simply open automatically if someone approaches. From an energy perspective, one does not want the doors 94 to open unnecessarily, but this is often the case in many commercial and industrial applications wherein someone walking near the door 94 triggers the door 94 to open, even though the person who is near the door 94 is not actually planning on walking through the door 94.

With particular reference to FIG. 17C, the exit sign 10 alone or in combination with the lighting fixtures 98 may determine the direction of travel of the person, and when the person is traveling in a direction and at a velocity that indicates the person is intending to either enter or leave the building through the door 94, the exit sign 10 may instruct the door control mechanism DC to open the door at the appropriate time and close the door when it is determined that the person has safely passed through the threshold of the door 94. If the person is leaving, and no other occupants are detected in that area, the exit sign 10 may also instruct the lighting fixtures 98 to turn off, decrement the occupancy count, and instruct the other exit signs 10 to do the same.

However, in the scenario illustrated in FIG. 17D, the exit sign 10 may prevent the door 94 from opening when it is determined that individuals passing near the door 94 are not traveling in a direction or at a velocity indicative of an intention of passing through the door 94. As such, when people are simply walking in parallel with the door 94, and they are not acting like they are going to walk through the door 94, the exit sign 10 will not instruct the door control mechanism DC to open the door 94. However, the exit sign 10 will detect the occupancy and share that information with the lighting fixtures 98 in the subgroup, in certain embodiments.

Accordingly, the exit sign 10 may be used to provide predictive actuation of virtually anything, such as pre-fetching an elevator, opening a door, turning lights on outside of the door 94 or inside of the door 94, flash the auxiliary light sources 20, instruct the lighting fixtures 98 to provide a certain lighting function, display certain text on the display 26, emit an audible tone or alert, control filter systems, and the like. The processing may be provided completely by the exit sign 10 or the ISM 22 located thereon, at a remote entity, or distributed among many entities, wherein part of the distributed processing may be provided by the exit sign 10.

Figure 17E:
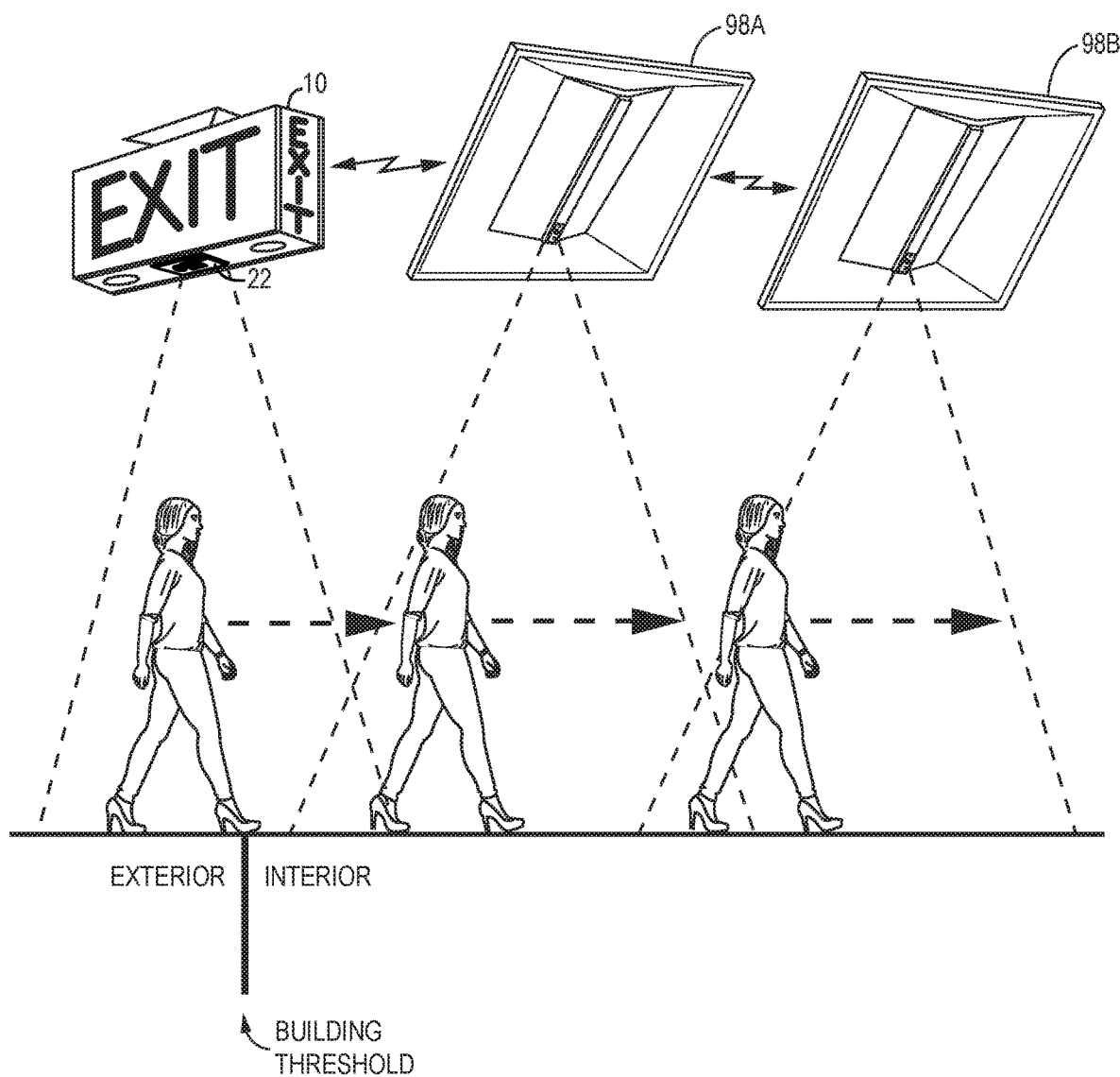
FIG. 17E illustrates an occupant entering a building and proceeding down an area that is illuminated with lighting fixtures that are in direct or indirect communication with an exit sign.

FIG. 17E provides another non-limiting example of a predictive behavior. Assume that a person walks into a building through a door 94 and continues to walk through a lobby or down a hallway, which is illuminated by lighting fixtures 98A and 98B. Lighting fixtures 98A and 98B are along the path of travel such that, in this example, the person will pass by the exit sign 10, then the lighting fixture 98A, and then the lighting fixture 98B. As the person arrives at the building and walks into the building, the exit sign 10 will detect the presence of the person and monitor the direction and velocity of travel of the person. At this point, assume that the lighting fixtures 98A and 98B are off, and their associated occupancy sensors are set to a less sensitive level to conserve energy. When the exit sign 10 detects the person and determines that the person is traveling in a direction toward lighting fixture 98A, the exit sign 10 may provide an alert to the lighting fixture 98A indicating the same. In response, the lighting fixture 98A may increase the sensitivity of its occupancy sensor and/or turn on to help illuminate the predicted path of the person. Lighting fixture 98A may then detect the person, and if it is determined that the person is traveling in the direction of lighting fixture 98B, lighting fixture 98A may alert lighting fixture 98B to increase the sensitivity of its occupancy sensor and/or turn on.

In the instances where the sensitivity of the occupancy sensors are increased, the lighting fixtures 98A and 98B may not turn on until they actually detect the presence of the person. Alternatively, the exit sign 10 may simply instruct lighting fixtures 98A and 98B to turn on, or in the alternative, increase their occupancy sensitivity together. Regardless of the particular configuration, the exit sign 10 being equipped with intelligence, sensors, and being part of the lighting network 100 or other building control systems greatly enhances the ability to predictable actuate any number of building functions based on whether a person is entering or exiting the building and/or knowing the number of occupants within the building.

As indicated above, the exit sign 10 may receive information and instructions from virtually any number of entities associated with the lighting network 100 or other control system. As such, the exit sign 10 may control its internal light source 36, auxiliary light sources 20, and/or display 26 based not only on the information being sensed at the exit sign 10, but also information and instructions provided from other entities. For example, the relative brightness of the exit sign 10 or its display 26 may change based on ambient lighting conditions, occupancy levels, time of day, emergency status, and the like.

As described above, exit signs 10 are generally associated with a battery backup 50, which is used to power the exit sign 10 when AC power is lost. Since the exit sign 10 remains powered, occupancy tracking may continue and occupancy information may be shared between the exit signs 10, assuming they are within communication range and/or the routing infrastructure of the lighting network 100 also has auxiliary power. Based on a variety of factors, including the presence or number of occupants or any other environmental condition, the exit sign 10 may take any number of actions. For example, the exit sign 10 may turn on or brighten the auxiliary light source 20 to provide additional lighting at the exit for a certain amount of time or until certain conditions, such as a lack of occupancy, is detected. The exit sign 10 may also provide alerts or information on the display 26, which is helpful in a power outage condition. Alternatively, the internal light source 36 may be controlled in an effort to increase the visibility of the exit sign 10 or provide supplemental information, such as flashing or changing color to indicate the power outage condition, identify a preferred exit, or identify an exit to avoid.

For extended power outage conditions, there is always a risk that the charge in the battery backup 50 will be depleted. As such, the exit sign 10 may take steps to save power and prolong the functionality of the exit sign 10 in a power outage condition. For example, the exit sign 10 may actually dim the internal light source 36 upon detecting the power outage condition, after a certain amount of time after detecting the power outage condition, or after detecting the power outage condition and detecting a lack of occupancy, and the like. In addition to or instead of dimming the internal light source 36, the exit sign 10 may flash its internal light source 36 to further reduce energy consumption. The exit sign 10 could also control the internal light source 36 to change color temperature or other lighting characteristics in an effort to become more efficient. For example, when the internal light source 36 is used to provide back lighting or actual lighting of the information of the exit sign 10, a certain color that is less efficient but is deemed more pleasing may be used during normal operation, wherein a less pleasing but much more efficient color temperature may be used during power outage conditions. The same or similar techniques may be used during emergency conditions.

In other embodiments, during power outage conditions or during normal operation, these energy-saving techniques such as dimming the internal light source 36, turning off the auxiliary light source 20, dimming or turning off the display 26, and the like, may be used during normal operation when there is no occupancy in a given area or within the entire building to reduce power during normal operation as well as to extend the functionality of the exit sign 10 during power outage conditions. For example, if the exit signs 10 communicate with one another and track total occupancy of the building, the exit signs 10 that are not at the exits of the building, but along the interior hallways and within interior rooms of the building, may be dimmed or turned off when there is no occupancy in the building, wherein the exit signs 10 that are located at the exits function in a normal fashion.

From the above, there are numerous benefits associated with incorporating sensors in exit signs 10, as well as providing higher levels of intelligence and communication capability in exits signs 10. Gathering occupancy and other information at the entry and exit points of the building affords greater functionality throughout the entire building during both normal and emergency states of operation.

Figure 18:
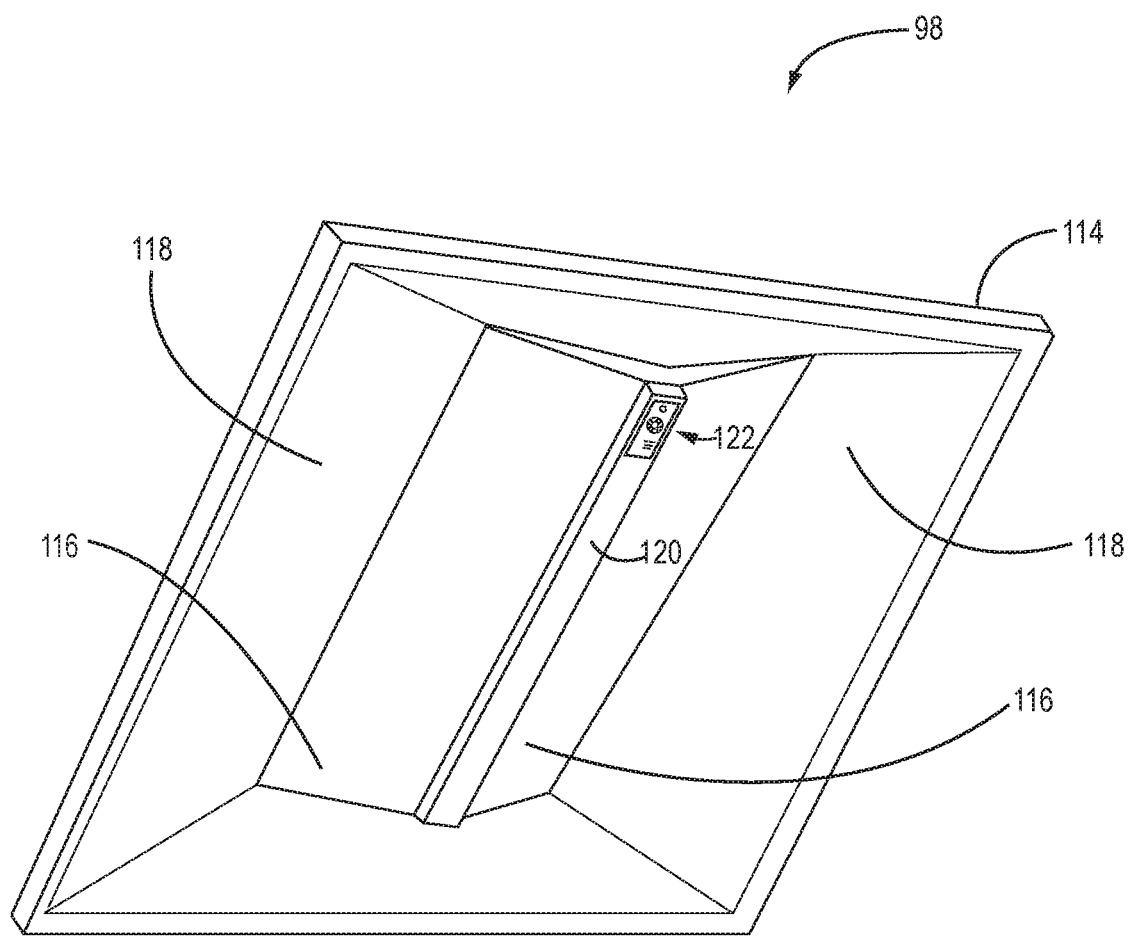
FIG. 18 is an isometric view of a lighting fixture according to one embodiment of the disclosure.
Figure 19:
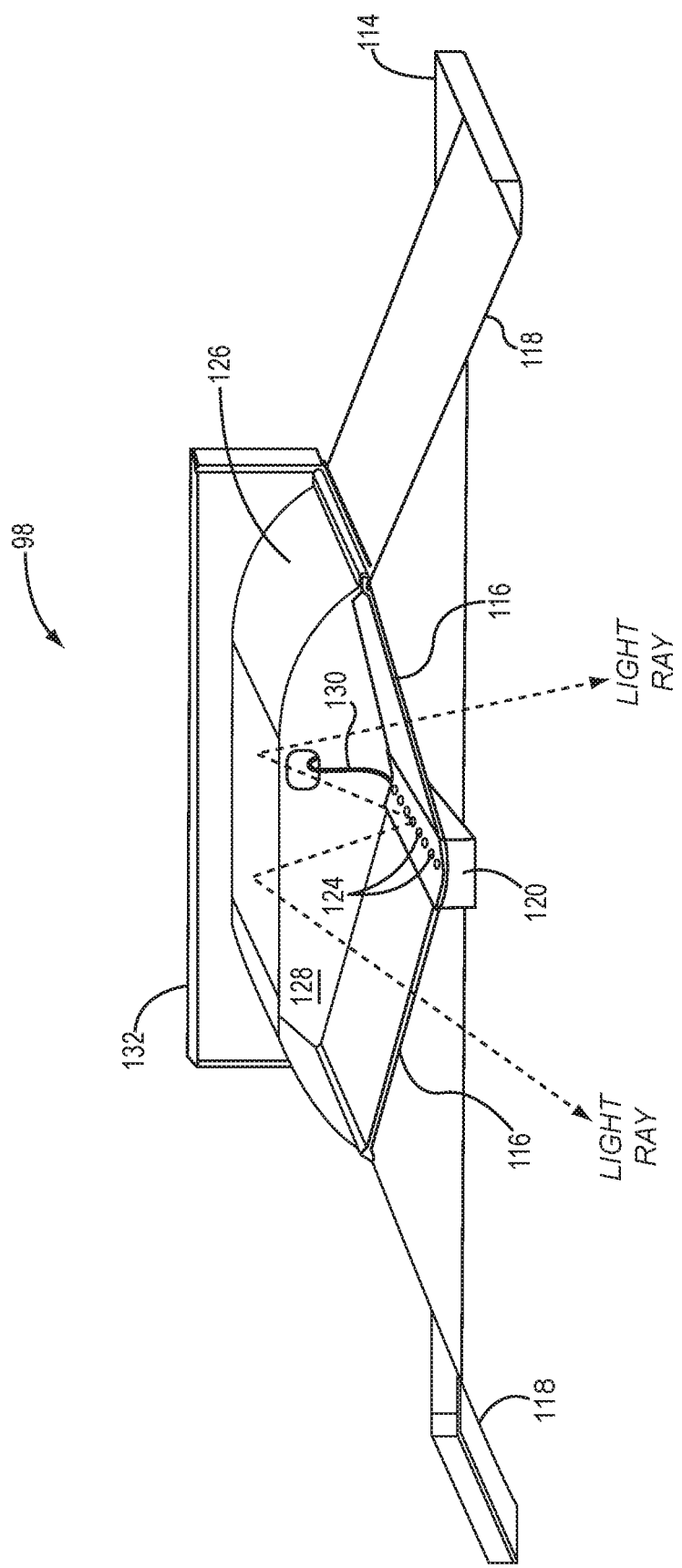
FIG. 19 is a cross-sectional view of the lighting fixture of FIG. 18.

The following description describes a troffer-type lighting fixture, such as the lighting fixture 98 illustrated in FIGS. 18 and 19. This particular lighting fixture 98 is substantially similar to the CR and CS series of troffer-type lighting fixtures that are manufactured by Cree, Inc. of Durham, N.C.

In general, troffer-type lighting fixtures, such as the lighting fixture 98, are designed to mount in, on, or from a ceiling. In most applications, the troffer-type lighting fixtures are mounted into a drop ceiling (not shown) of a commercial, educational, or governmental facility. As illustrated in FIGS. 18 and 19, the lighting fixture 98 includes a square or rectangular outer frame 114. In the central portion of the lighting fixture 98 are two rectangular lenses 116, which are generally transparent, translucent, or opaque. Reflectors 118 extend from the outer frame 114 to the outer edges of the lenses 116. The lenses 116 effectively extend between the innermost portions of the reflectors 118 to a central mounting member 120, which may double as a heatsink and functions in this embodiment to join the two inside edges of the lenses 116.

As described in detail further below, an intelligent lighting module (ILM) 122 may be mounted in, on, or to the central mounting member 120 or any other suitable portion of the lighting fixture 98. The ILM 122 provides intelligence for the lighting fixture 98, houses one or more sensors, and facilitates wired and/or wireless communications with other lighting fixtures 98, networking entities, control entities, and the like. As noted, further details are provided below. The communications with other lighting fixtures 98 may relate to sharing state information and sensor information, as well as providing instructions or other information that aids in the control of the lighting fixtures 98 individually or as a group during normal operation or commissioning. For example, the lighting fixtures 98 may employ lightcasting to recognize the presence of each other and form groups based on such recognition. For further information on lightcasting, group formation, and general lighting operation, please see U.S. patent application nos. 15/192,308, filed Jun. 24, 2016, and published Aug. 10, 2017, as U.S. Pat. Publication No. 2017/0230364A1; Ser. No. 15/192,479, filed Jun. 24, 2016, now U.S. Pat. No. 10,192,316; 15/192,035, filed Jun. 24, 2016, now U.S. Pat. No. 10,251,245; 15/191,846, filed Jun. 24, 2016, now U.S. Pat. No. 9,826,598; and Ser. No. 15/191,753, filed Jun. 24, 2016, now U.S. Pat. No. 10,306, 738, which are incorporated herein by reference in their entireties.

Turning now to FIG. 19 in particular, the back side of the central mounting member 120 provides a mounting structure for a solid-state light source, such as an LED array 124, which includes one or more rows of individual LEDs mounted on an appropriate substrate. The LEDs are oriented to primarily emit light upwards toward a concave cover 126. The volume bounded by the cover 126, the lenses 116, and the back of the central mounting member 120 provides a mixing chamber 128. As such, light will emanate upwards from the LEDs of the LED array 124 toward the cover 126 and will be reflected downward through the respective lenses 116, as illustrated in FIG. 19. Notably, not all light rays emitted from the LEDs will reflect directly off of the bottom of the cover 126 and back through a particular lens 116 with a single reflection. Many of the light rays will bounce around within the mixing chamber 128 and effectively mix with other light rays, such that a desirably uniform light is emitted through the respective lenses 116.

Those skilled in the art will recognize that the type of lenses 116, the type of LEDs, the shape of the cover 126, and any coating on the bottom side of the cover 126, among many other variables, will affect the quantity and quality of light emitted by the lighting fixture 98. As will be discussed in greater detail below, the LED array 124 may include LEDs of different colors, wherein the light emitted from the various LEDs mixes together to form a white light having a desired characteristic, such as spectral content (color or color temperature), color rendering index (CRI), output level, and the like based on the design parameters for the particular embodiment, environmental conditions, or the like.

If the central mounting member 120 functions as a heatsink, fins (not shown) may extend from the central mounting member 120 in any direction. If the fins extend from the bottom of the central mounting member 120, the fins may be visible from the bottom of the lighting fixture 98. Placing the LEDs of the LED array 124 in thermal contact along the upper side of the central mounting member 120 allows any heat generated by the LEDs to be effectively transferred to the bottom side of the central mounting member 120 for dissipation within the room in which the lighting fixture 98 is mounted.

Figure 20:
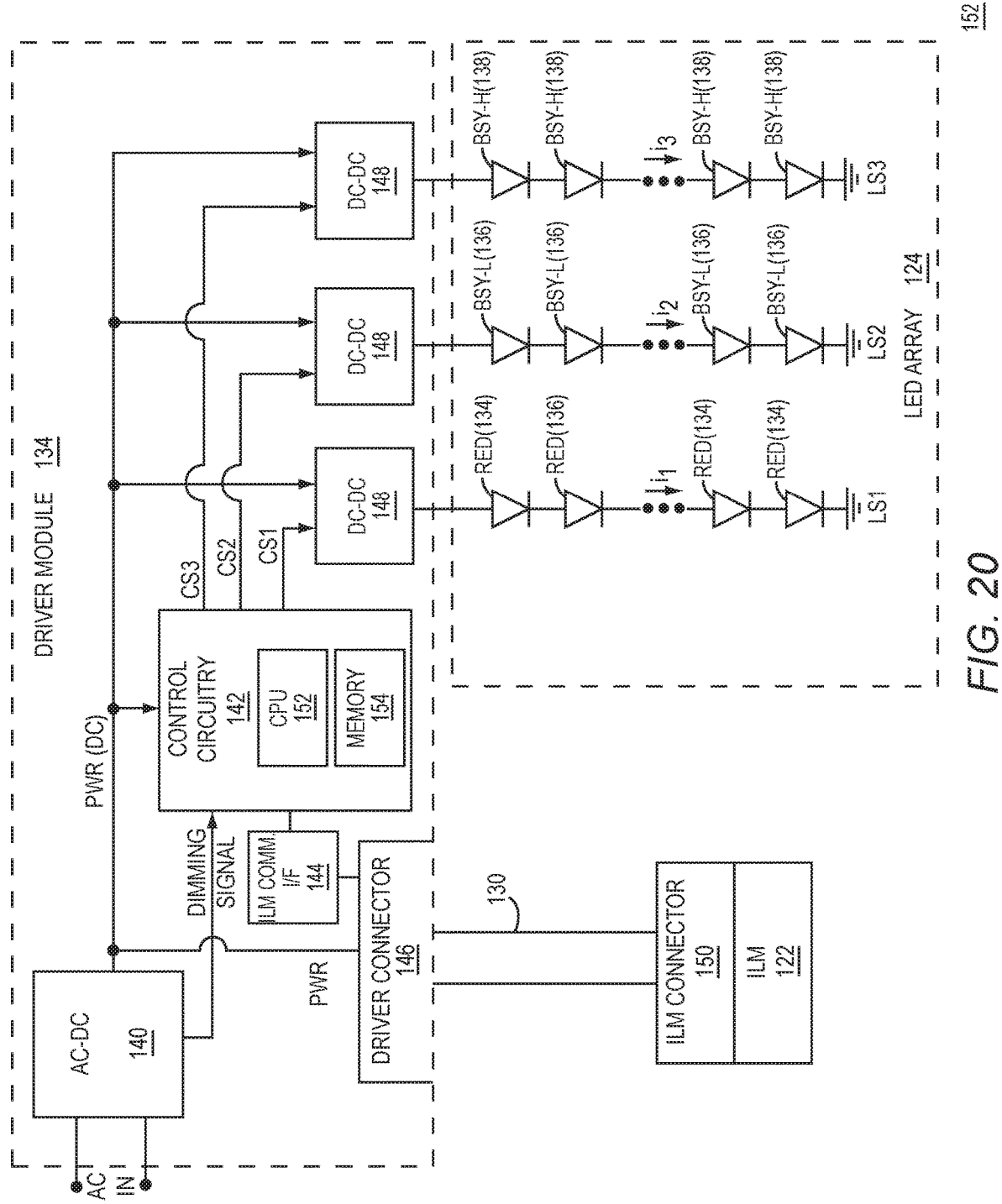
FIG. 20 is schematic of the electronics of the lighting fixture of FIG. 18.

As illustrated in FIG. 20, a driver module 134 is coupled to the LED array 124 and the ILM 122 through appropriate cabling 130. The driver module 134 is used to drive the LED array 124 to provide a desired light output level in response to instructions from the ILM 122. The ILM 122 uses its internal logic to determine an on/off state and an output level based on information received from one or more of the integrated sensors, other lighting fixtures 98, exit signs 10 and/or remote entities, such as wall controllers, mobile terminals, personal computers, and the like. The integrated sensors may include one or more ambient light, occupancy (motion), sound, temperature, humidity, pressure, vibration, carbon monoxide, carbon dioxide, air quality, smoke, image, power, or like sensors. The ILM 122 may also send information bearing on the state of the lighting fixture 98, sensor measurements, and the like to one or more of the other lighting fixtures 98, exit signs 10 and/or remote entities, such as wall controllers 108, mobile terminals, personal computers, and the like. The ILM 122 may also send control information that is configured to cause other lighting fixtures 98, exit signs 10 or groups thereof, to turn on, turn off, transition to a desired light output level and/or operation in a certain manner. As such, the lighting fixtures 98 may communicate with one another as well as the exit signs 10 to share sensor measurements and state information, such that desired groups of lighting fixtures 98 and exit signs 10 act in unison in response to sensed environmental conditions, state information, sensor measurements or instructions from other lighting fixtures 98, exit signs 10, control entities, or a combination thereof.

Continuing to reference FIG. 20, the LED array 124 may include a mixture of LEDs of different colors. While those skilled in the art will recognize various color combinations, the following example employs red LEDs 135 that emit reddish light at a first wavelength, blue shifted yellow (BSY) LEDs 136 that emit yellowish/greenish light at a second wavelength, and BSY LEDs 138 that emit yellowish/greenish light at a third wavelength, which is different than the second wavelength. The LED array 124 may be divided into multiple strings of series connected LEDs. In essence, LED string LS1, which includes a number of red LEDs 135, forms a first group of LEDs. LED string LS2, which includes BSY LEDs 136, forms a second group of LEDs. LED string LS3, which includes BSY LEDs 138, forms a third group of LEDs.

In general, the driver module 134 controls the drive currents $i_1$, $i_2$, and $i_3$, which are used to drive the respective LED strings LS1, LS2, and LS3. The ratio of drive currents $i_1$, $i_2$, and $i_3$ that are provided through respective LED strings LS1, LS2, and LS3 may be adjusted to effectively control the relative intensities of the reddish light emitted from the red LEDs 135 of LED string LS1, the yellowish/greenish light emitted from the BSY LEDs 136 of LED string LS2, and the yellowish/greenish light emitted from the BSY LEDs 138 of LED string LS3. The resultant light from each LED string LS1, LS2, and LS3 mixes to generate an overall light output that has a desired color, correlated color temperature (CCT), and intensity, the latter of which may also be referred to a dimming level. As noted, the overall light output may be white light that falls on or within a desired proximity of the Black Body Locus (BBL) and has a desired CCT.

The number of LED strings LSx may vary from one to many and different combinations of LED colors may be used in the different strings. Each LED string LSx may have LEDs of the same color, variations of the same color, or substantially different colors. In the illustrated embodiment, each LED string LS1, LS2, and LS3 is configured such that all of the LEDs 135, 136, 138 that are in the string are all essentially identical in color. However, the LEDs 135, 136, 138 in each string may vary substantially in color or be completely different colors in certain embodiments. In another embodiment, three LED strings LSx with red, green, and blue LEDs may be used, wherein each LED string LSx is dedicated to a single color. In yet another embodiment, at least two LED strings LSx may be used, wherein the same or different colored BSY or blue shifted green (BSG) LEDs are used in one of the LED strings LSx and red LEDs are used in the other of the LED strings LSx. A single string embodiment is also envisioned, where currents may be individually adjusted for the LEDs of the different colors using bypass circuits, or the like.

The driver module 134 depicted in FIG. 20 includes AC-DC conversion circuitry 140, control circuitry 142, an ILM communication interface (I/F) 144, a driver connector 146, and a number of current sources, such as the illustrated DC-DC converters 148. The AC-DC conversion circuitry 140 is configured to receive an AC power signal (AC IN), rectify the AC power signal, correct the power factor of the AC power signal, and provide a DC power signal (PWR). The DC power signal may be used to directly or indirectly power the control circuitry 142 and any other circuitry provided in the driver module 134, including the DC-DC converters 148 and the ILM communication interface (I/F) 144. The DC power signal may also be provided to the driver connector 146 to power the ILM 122. The cabling 130 may extend from the driver connector 146 to an ILM connector 150, which may be mounted to or in the central mounting member 120 (FIGS. 18 and 19) or other portion of the lighting fixture 98. In one embodiment, the ILM connector 150 is configured to releasably engage the ILM 122. When the cabling 130 is connected and the ILM 122 is engaged with the ILM connector 150, the ILM 122 can receive the DC power signal as well as communicate bidirectionally with the control circuitry 142 of the driver module 134 via the ILM communication interface 144 using proprietary or standard communication protocols.

To control the light output of the LED array 124, the ILM 122 will determine a desired light output level based on one or more of the factors described above and send an instruction to the driver module 134. The driver module 134 will receive the instruction, determine the desired light output level from the instruction, and drive the LED array 124 in a manner to provide the light output level. The driver module 134 may acknowledge receipt of the instruction and/or provide sufficient feedback to the ILM 122 that the LED array 124 is being driven according to the instruction. From an off state, the ILM 122 may instruct the driver module 134 to turn on and drive the LED array 124 to provide a particular light output level in response to determining that the lighting fixture 98 should turn on. From an on state, the ILM 122 may instruct the driver module 134 to stop driving the LED array 124 in response to determining that the lighting fixture 98 should turn off.

In response to an instruction by the ILM 122 to output light at a particular light output level, the three respective DC-DC converters 148 of the driver module 134 provide drive currents $i_1$, $i_2$, and $i_3$ for the three LED strings LS1, LS2, and LS3 in response to control signals CS1, CS2, and CS3. The control signals CS1, CS2, and CS3 may be pulse width modulated (PWM) signals that effectively turn the respective DC-DC converters 148 on during a logic high state and off during a logic low state of each period of the PWM signal. As a result, the drive currents $i_1$, $i_2$, and $i_3$ for the three LED strings LS1, LS2, and LS3 may also be PWM signals. The intensity of light emitted from each of the three LED strings LS1, LS2, and LS3 will vary based on the duty cycle of the respective PWM signals. The control circuitry 142 will adjust the duty cycle of the drive currents $i_1$, $i_2$, and $i_3$ provided to each of the LED strings LS1, LS2, and LS3 to effectively adjust the intensity of the resultant light emitted from the LED strings LS1, LS2, and LS3 while maintaining the desired CCT based on instructions from the ILM 122.

In an alternative embodiment, the drive currents $i_1$, $i_2$, and $i_3$ for the three LED strings LS1, LS2, and LS3 may be variable DC currents instead of PWM signals. In certain instances, a dimming device, such as a wall controller, may control the AC power signal, provide a separate a 0-10 volt DC signal, or the like to the driver module 134. The AC-DC conversion circuitry 140 or other electronics may be configured to detect the relative amount of dimming associated with the AC power signal or 0-10 volt DC signal and provide a corresponding dimming signal (DIMMING SIGNAL) to the control circuitry 142 of the driver module 134. The control circuitry 142 may pass information based on the dimming signal to the ILM 122 via the ILM communication interface 144. The ILM 122 can take the dimming information into consideration when providing instructions to the driver module 134.

The control circuitry 142 may include a central processing unit (CPU) 152 and sufficient memory 154 to enable the control circuitry 142 to bidirectionally communicate with the ILM 122 through the ILM communication interface 144 using a defined protocol, such as the Digital Addressable Lighting Interface (DALI) or DALI2. The control circuitry 142 may receive data or instructions from the ILM 122 and take appropriate action to process the data and implement the received instructions. The instructions may range from controlling how the LED array 124 is driven to returning operational data of the driver module 134 to the ILM 122.

Notably, when the term "control system" is used in the claims or generically in the specification, the term should be construed broadly to include the hardware and any additional software or firmware that is needed to provide the stated functionality. The term "control system" should not be construed as only software, as electronics are needed to implement control systems described herein. For example, a control system may, but does not necessarily, include the control circuitry 142, the DC-DC converters 148, the AC-DC conversion circuitry 140, and the like.

Figure 21:
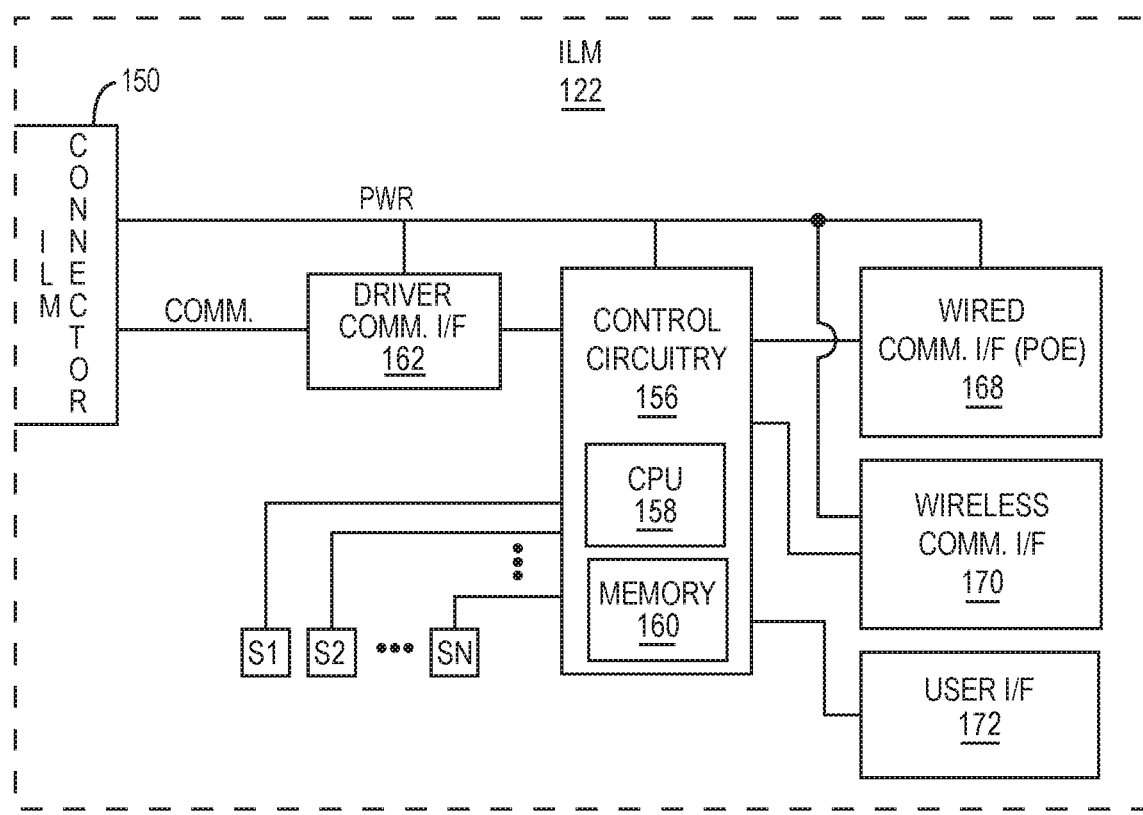
FIG. 21 is schematic of an intelligent lighting module of the electronics of the lighting fixture of FIG. 18 according to one embodiment of the disclosure.

With reference to FIG. 21, a block diagram of one embodiment of the ILM 122 is illustrated. The ILM 122 includes control circuitry 156 having an associated CPU 158 and memory 160, which contains the requisite software, instructions, and data to facilitate operation as described herein. The control circuitry 156 may be associated with a driver communication interface 162, which is to be coupled to the driver module 134, directly or indirectly via the ILM connector 150. The control circuitry 156 may be associated with a wired communication interface 168, a wireless communication interface 170, or both, to facilitate wired or wireless communications with other lighting fixtures 98, exit signs 10, and/or remote entities, such as wall controllers, mobile terminals, personal computers, and the like. The wireless communication interface 170 may include the requisite transceiver electronics to facilitate wireless communications with remote entities using any number of wireless communication protocols. The wired communication interface 168 may support universal serial (USB), Ethernet, or like interfaces using any number of wired communication protocols.

In one embodiment, the ILM 122 may receive power in the form of a DC signal from the driver module 134 via the ILM connector 150 and facilitate communications with the driver module 134 via the driver communication interface 162 and the ILM connector 150. Communications with other lighting fixtures 98, exit signs 10, and/or remote entities, such as wall controllers, mobile terminals, personal computers, and the like are facilitated via the wired or wireless communication interfaces 168, 170.

In an alternative embodiment, the ILM 122 will receive power in the form of a DC power signal via the wired communication interface 168, which may be configured as a power over Ethernet (PoE) interface. The DC power signal received via the wired communication interface 168 is used to power the electronics of the ILM 122 and is passed to the driver module 134 via the ILM connector 150. The driver module 134 will use the DC power signal to power the electronics of the driver module 134 and drive the LED array 124. Communications with other lighting fixtures 98, exit signs 10, and/or remote entities, such as wall controllers, mobile terminals, personal computers, and the like are facilitated via the wired communication interface 168. The ILM 122 will facilitate communications with the driver module 28 via the driver communication interface 162 and the ILM connector 150.

As noted, the ILM 122 includes multiple integrated sensors S1-SN, which are directly or indirectly coupled to the control circuitry 156. The sensors S1-SN may include one or more ambient light, occupancy (motion), sound, temperature, humidity, pressure, vibration, carbon monoxide, carbon dioxide, air quality, smoke, power, image, or like sensors. The sensors S1-SN provide sensor data to the control circuitry 156. Based on internal logic, the ILM 122 will determine how the driver module 134 should drive the LED array 124 based on the sensor data and any other data or instructions received from remote entities, such as other lighting fixtures 98, exit signs 10, wall controllers, mobile terminals, personal computers, and the like. Based on how the driver module 134 should drive the LED array 124, the ILM 122 will generate and send appropriate instructions to the driver module 134 via the driver communication interface 162 and the ILM connector 150. The driver module 134 will drive the LED array 124 based on the instructions received from the ILM 122. These instructions may result in the driver module 134 turning off the LED array 124, turning on the LED array 124 to a certain light output level, changing the light output level provided by the LED array 124, changing the color or CCT of the light output, and the like.

In addition to controlling the driver module 134 to control the light output of the LED array 124, the ILM 122 may play an important role in coordinating intelligence and sharing data among the lighting fixtures 98 and exit signs 10. In addition to receiving data and instructions from other lighting fixtures 98, exit signs 10, or remote control entities and using such information to control the driver module 134, the ILM 122 may also provide instructions to other lighting fixtures 98, exit signs 10, and remote control entities based on the sensor data from its integrated sensors S1-SN as well as the sensor data and instructions received from the other lighting fixtures 98, exit signs 10, and remote control entities.

The ILM 122 may have a user interface 172 that provides information related to the state or operation of the ILM 122, allows a user to manually provide information to the ILM 122, or a combination thereof. As such, the user interface 172 may include an input mechanism, an output mechanism, or both. The input mechanism may include one or more of buttons, keys, keypads, touchscreens, microphones, or the like. The output mechanism may include one more LEDs, a display, or the like. For the purposes of this application, a button is defined to include a push button switch, all or part of a toggle switch, rotary dial, slider, or any other mechanical input mechanism.

Figure 22A:
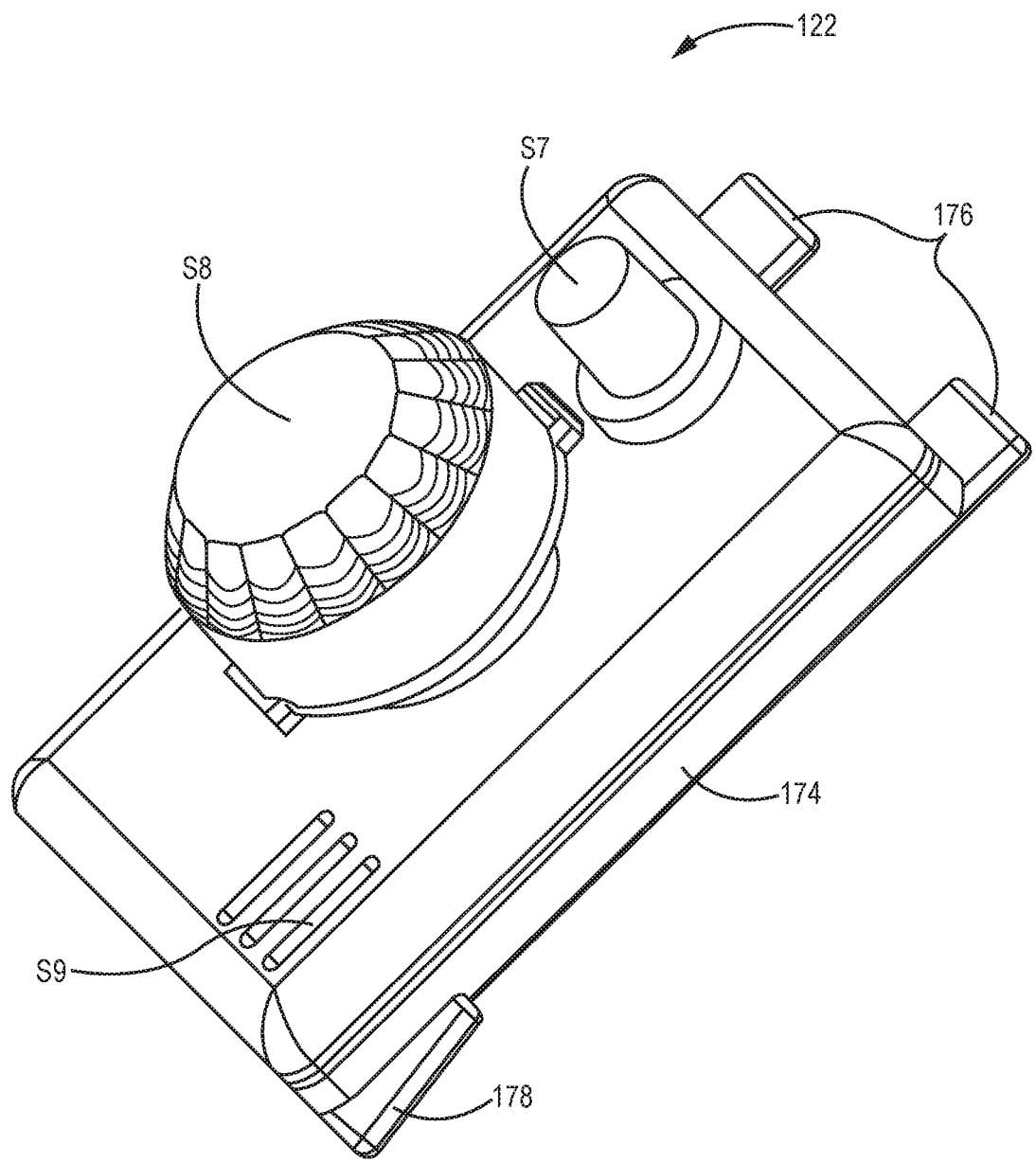
FIGS. 22A and 22B are alternative embodiments of the intelligent lighting module of FIG. 21.
Figure 22B:
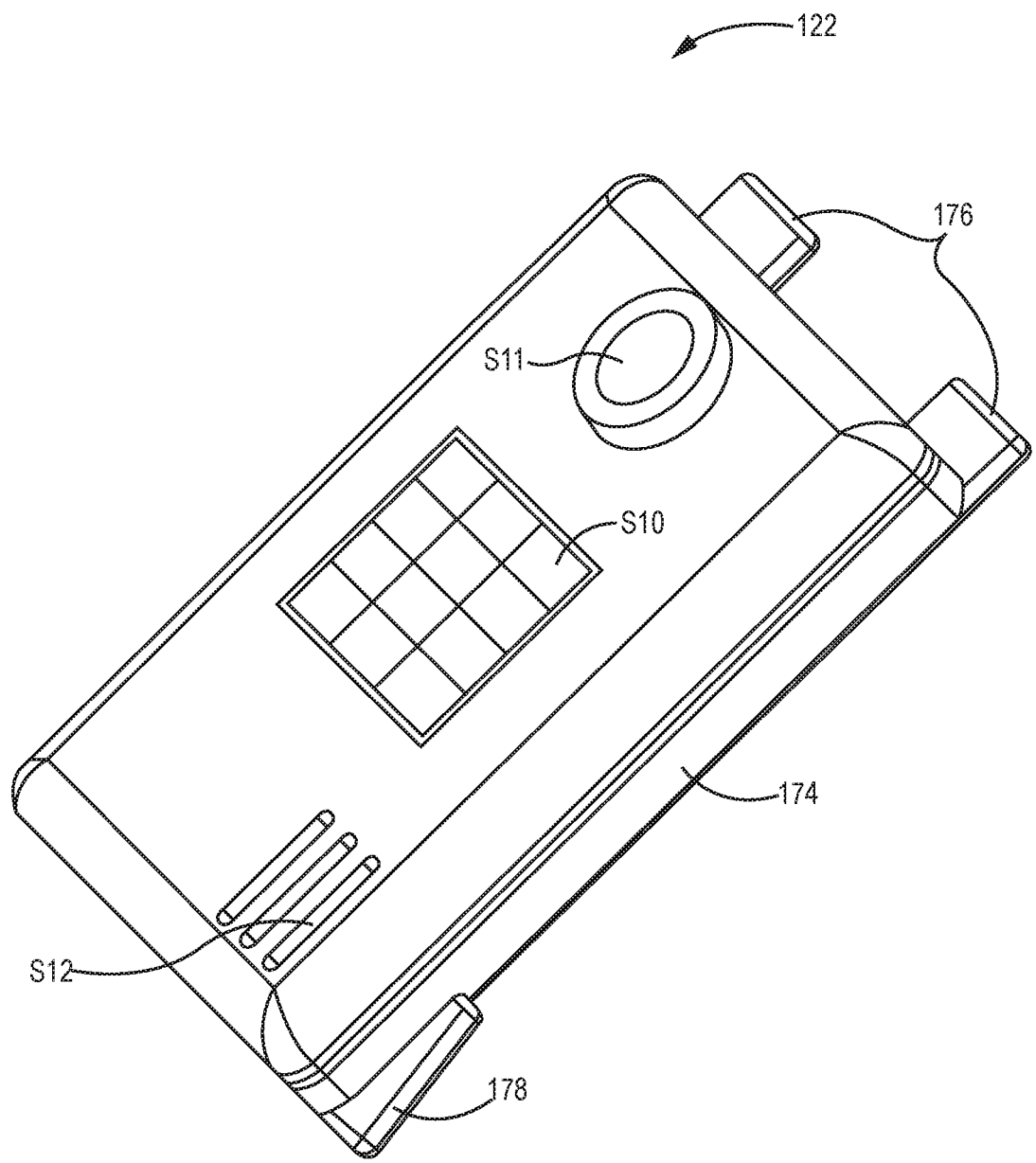

The ILM 122 may take on various configurations, such as that illustrated in FIGS. 22A and 22B. In such an embodiment, the ILM 122 has the same form factor, and potentially the same circuitry, software, firmware, and the like, as the ISM 22 in an effort to make the ILM 122 and the ISM 22 interchangeable, or otherwise compatible, with or without the need for software and/or firmware changes. A first exemplary ILM 122 is illustrated in FIG. 22A. The ILM 122 has a housing 174 in or on which sensors S7, S8, and S9 and the electronics described above are mounted. In this particular, but non-limiting, embodiment, sensor S7 is an ambient light sensor, sensor S8 is an occupancy sensor, and sensor S9 is a pressure sensor mounted behind three openings that are provided in the housing 174. FIG. 22B illustrates another sensor configuration for the ILM 122 that includes an image sensor S10, a vibration sensor S11, and a microphone S12, wherein the image sensor S10 may be configured and used to monitor ambient light, detect occupancy, recognize people or objects, and the like. In this instance, the housing 174 of the ILM 122 is configured to releasably engage a compatible cradle, such as that illustrated in FIG. 9 or the like provided by the lighting fixture 98 in a snap-fit manner. As illustrated in FIGS. 22A and 22B, the housing 174 may include two front tabs 176 that extend outward from a bottom portion of the front wall of the housing 174. Further, opposing side tabs 178 extend outward from bottom portions of opposing side walls of the housing 174. The side tabs 178 are biased toward the rear wall of the housing 174, as provided in the ISM 22. Those skilled in the art will appreciate that the ISM 22 and the ILM 122 do not need to be similarly configurable, compatible, or the like.

When an ILM 122 in a lighting fixture 98 is replaced, the new ILM 122 may communicate with the other lighting fixtures 98 or remote entities in the associated lighting network and/or subgroup thereof as a new lighting fixture 98 or a replacement lighting fixture 98, depending on the desires of the lighting designer. When the new ILM 122 joins the lighting network and/or subgroup thereof, the new ILM 122 will report its capabilities to the other lighting fixtures 98 or remote entities, facilitate any necessary handshaking, and begin operating and/or sharing data based on its new capabilities.

While an exit sign 10 was described in the embodiments above, the concepts provided herein apply to any type of sign that is used to present or display information to building occupants. The signs may be used for providing directions, identification information, location information, warnings, greetings, and the like. Those skilled in the art will recognize improvements and modifications to the preferred embodiments of the present disclosure. All such improvements and modifications are considered within the scope of the concepts disclosed herein and the claims that follow.

What is claimed is:

1. An exit sign comprising:
    a body having a panel displaying information related to a building exit;
    a first light source configured to illuminate the information;
    a first sensor;
    a communication interface; and
    control circuitry connected to the first light source and the first sensor and configured to:
        receive first sensor data from the first sensor; and
        provide an exit sign operation based on the first sensor data, wherein to provide the exit sign operation the control circuitry is further configured to:
            determine a direction of travel of an individual within an area associated with the exit sign based on the first sensor data;
            predict a path of the individual based on the direction of travel;

in response to predicting the path of the individual, provide sensor information based on the first sensor data to at least one other exit sign;

determine if at least one lighting fixture is along the predicted path of the individual; and in response to determining that the at least one lighting fixture is along the predicted path of the individual, send an instruction to turn on the at least one lighting fixture.

2. The exit sign of claim 1 wherein to provide the exit sign operation, the control circuitry is further configured to determine whether the area associated with the exit sign is occupied based at least in part on the first sensor data.

3. The exit sign of claim 2 wherein to provide the exit sign operation, the control circuitry is further configured to send information indicative of whether the area associated with the exit sign is occupied to the at least one lighting fixture via the communication interface.

4. The exit sign of claim 1 wherein to provide the exit sign operation, the control circuitry is further configured to:

determine when the individual enters the area associated with the exit sign based on the first sensor data and increment an occupancy count based on the individual entering the area associated with the exit sign; and determine when the individual exits the area associated with the exit sign based on the first sensor data and decrement the occupancy count based on the individual exiting the area associated with the exit sign.

5. The exit sign of claim 4 wherein to provide the exit sign operation, the control circuitry is further configured to receive information indicative of the individual entering or exiting the area associated with the exit sign from the at least one lighting fixture and respectively incrementing or decrementing the occupancy count based on the information indicative of the individual entering or exiting the area associated with the exit sign.

6. The exit sign of claim 1 wherein to provide the exit sign operation, the control circuitry is further configured to:

determine when the individual enters or exits the area associated with the exit sign based on the first sensor data; and send information indicative of the individual entering or exiting the area associated with the exit sign to the at least one lighting fixture via the communication interface.

7. The exit sign of claim 1 wherein the control circuitry is further configured to determine a velocity of travel of the individual based on the first sensor data and send information indicative of the velocity of travel of the individual to the at least one lighting fixture.

8. The exit sign of claim 1 further comprising a display associated with the control circuitry, and wherein to provide the exit sign operation, the control circuitry is further configured to determine a number of people in the area associated with the exit sign based on the first sensor data.

9. The exit sign of claim 1 wherein the first sensor is an image sensor.

10. The exit sign of claim 1 wherein to provide the exit sign operation, the control circuitry is further configured to control the first light source based on the first sensor data.

11. The exit sign of claim 1 wherein to provide the exit sign operation, the control circuitry is further configured to generate an additional instruction for the at least one lighting fixture based on the first sensor data and send the additional instruction to the at least one lighting fixture via the communication interface.

12. The exit sign of claim 1 wherein the control circuitry is further configured to receive an additional instruction from the at least one lighting fixture or the at least one other exit sign via the communication interface, and provide the exit sign operation in response to receiving the additional instruction from the at least one lighting fixture or the at least one other exit sign.

13. The exit sign of claim 1 wherein:

to provide the exit sign operation, the control circuitry is further configured to join a lighting network via the communication interface; and the at least one lighting fixture is a member of the lighting network.

14. The exit sign of claim 1 wherein:

to provide the exit sign operation, the control circuitry is further configured to join a communication network via the communication interface; and the at least one lighting fixture and the at least one other exit sign are members of the communication network.

15. The exit sign of claim 1 wherein:

to provide the exit sign operation, the control circuitry is further configured to join a communication network via the communication interface; and the at least one other exit sign is a member of the communication network.

16. The exit sign of claim 1 further comprising at least one other sensor that is different than the first sensor and associated with the control circuitry.

17. The exit sign of claim 1 wherein the control circuitry is further configured to:

receive power from an AC power source when the power is provided by the AC power source, and receive the power from a battery backup when the power is not provided by the AC power source;

when the power is provided by the AC power source, control the first light source to output light at a first output level;

determine when the power is not provided by the AC power source; and when the power is not provided by the AC power source, control the first light source to output light at a second output level, which is different from the first output level.

18. The exit sign of claim 1 wherein to provide the exit sign operation, the control circuitry is further configured to:

determine a velocity of the individual based on the first sensor data;

predict the path of the individual based further on the velocity;

determine whether the individual is about to pass through a door associated with the exit sign based on the predicted path of the individual; and send an additional instruction to open the door to a door controller associated with the door upon determining that the individual is about to pass through the door.

19. The exit sign of claim 1 wherein to provide the exit sign operation, the control circuitry is further configured to:

determine a velocity of the individual within the area associated with the exit sign based on the first sensor data;

predict the path of the individual based further on the velocity;

determine whether the individual is about to pass through a door associated with the exit sign or pass by the door without passing through the door based on the predicted path of the individual; and send an additional instruction to open the door to a door controller associated with the door upon determining that the individual is about to pass through the door, wherein the instruction to open the door is not provided upon determining that the individual will pass by the door without passing through the door.

20. The exit sign of claim 1 wherein the communication interface is a power over Ethernet interface through which communications with the at least one lighting fixture and the at least one other exit sign are facilitated and from which primary power for the exit sign is received.

21. The exit sign of claim 1, wherein the control circuitry is further configured to:
select a plurality of lighting fixtures along the predicted path of the individual; and
send an instruction to turn on the plurality of lighting fixtures.

22. The exit sign of claim 21, wherein the control circuitry is further configured to:
determine a velocity of travel of the individual based on the first sensor data; and
select the plurality of lighting fixtures based on the velocity of travel.

23. The exit sign of claim 1, wherein the sensor information provided to the at least one other exit sign comprises a change in an occupancy count.

24. An exit sign comprising:
a body having a panel displaying information related to a building exit;
a first light source configured to illuminate the information;
a first sensor;
a communication interface; and
control circuitry connected to the first light source and the first sensor and configured to:
    receive first sensor data from the first sensor; and
    provide an exit sign operation based on the first sensor data, wherein to provide the exit sign operation the control circuitry is further configured to:
        determine a direction of travel of an individual within an area associated with the exit sign based on the first sensor data;
        predict a path of the individual based on the direction of travel;
        determine if a remote entity is along the predicted path of the individual;
        in response to determining that the remote entity is along the predicted path of the individual, send a first instruction to the remote entity to cause the remote entity to perform a first action; and
        in response to second sensor data associated with the individual, send a second instruction to the remote entity to cause the remote entity to perform a second action.

25. The exit sign of claim 24 wherein the remote entity is another exit sign.

26. The exit sign of claim 24 wherein the remote entity is a lighting fixture.

27. The exit sign of claim 26, wherein:
the first action comprises turning on the lighting fixture; and
the second action comprises turning off the lighting fixture.

28. The exit sign of claim 27, wherein the control circuitry is further configured to:
determine a velocity of travel of the individual based on the first sensor data;
select a plurality of lighting fixtures based on the velocity of travel; and
send the first instruction to the plurality of lighting fixtures.

29. The exit sign of claim 24 wherein the remote entity is a door control system that controls a door adjacent the exit sign.

30. The exit sign of claim 29, wherein:
the first action comprises unlocking or opening the door; and
the second action comprises locking or closing the door.

31. The exit sign of claim 24 wherein to provide the exit sign operation, the control circuitry is further configured to send the first sensor data to the remote entity via the communication interface.

32. The exit sign of claim 31 wherein the remote entity is another exit sign.

33. The exit sign of claim 31 wherein the remote entity is a lighting fixture.

34. The exit sign of claim 24 wherein the remote entity is a door controller and the second instruction causes the remote entity to open a door.

35. The exit sign of claim 24 wherein the remote entity is a lighting fixture and the second instruction causes the remote entity to provide illumination.

36. The exit sign of claim 24, wherein the control circuitry is further configured to provide sensor information based on at least one of the first sensor data or the second sensor data to at least one other exit sign.

37. The exit sign of claim 36, wherein the sensor information provided to the at least one other exit sign comprises a change in an occupancy count.

38. The exit sign of claim 24 wherein the communication interface is a power over Ethernet interface through which communications with the remote entity are facilitated and from which primary power for the exit sign is received.

* * * * *